(12) United States Patent
Gilson

(10) Patent No.: US 9,154,813 B2
(45) Date of Patent: Oct. 6, 2015

(54) MULTIPLE VIDEO CONTENT IN A COMPOSITE VIDEO STREAM

(75) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 304 days.

(21) Appl. No.: 13/156,716

(22) Filed: Jun. 9, 2011

(65) Prior Publication Data

US 2012/0317598 A1 Dec. 13, 2012

(51) Int. Cl.
| | |
|---|---|
| H04N 7/173 | (2011.01) |
| H04N 5/445 | (2011.01) |
| G06F 3/00 | (2006.01) |
| G06F 13/00 | (2006.01) |
| G06F 3/048 | (2013.01) |
| H04N 21/2343 | (2011.01) |
| H04N 5/45 | (2011.01) |
| H04N 21/431 | (2011.01) |

(52) U.S. Cl.
CPC ....... *H04N 21/234345* (2013.01); *H04N 5/445* (2013.01); *H04N 5/45* (2013.01); *H04N 21/234309* (2013.01); *H04N 21/4314* (2013.01); *H04N 21/4316* (2013.01)

(58) Field of Classification Search
CPC ................................. H04N 5/45; H04N 5/445
See application file for complete search history.

(56) References Cited

U.S. PATENT DOCUMENTS

| | | | |
|---|---|---|---|
| 3,754,211 | A | 8/1973 | Rocher et al. |
| 4,213,124 | A | 7/1980 | Barda et al. |
| 4,250,356 | A | 2/1981 | Hammer, Jr. et al. |
| 4,250,521 | A | 2/1981 | Wright |
| 4,290,063 | A | 9/1981 | Traster |
| 4,381,522 | A | 4/1983 | Lambert |
| 4,437,093 | A | 3/1984 | Bradley |
| 4,479,142 | A | 10/1984 | Buschman et al. |

(Continued)

FOREIGN PATENT DOCUMENTS

| | | |
|---|---|---|
| EP | 0721253 A2 | 7/1996 |
| EP | 0725539 A2 | 8/1996 |

(Continued)

OTHER PUBLICATIONS

Office Action in Canadian Patent Application No. 2680673, dated Oct. 7, 2010.

(Continued)

*Primary Examiner* — Nathan Flynn
*Assistant Examiner* — James R Marandi
(74) *Attorney, Agent, or Firm* — Banner & Witcoff, Ltd.

(57) ABSTRACT

A request for a first video may be received from an end user device. A video size for the requested first video may be determined. An unused onscreen location to place the requested first video, within one of a plurality of composite mosaic video streams, may be determined. The unused onscreen location may correspond to a location for insertion of video content for output to an onscreen location of an output device. Information identifying the unused onscreen location may be transmitted to a content source of the requested first video. The requested first video based upon the unused onscreen location information may be received from the content source. The requested first video then may be placed with at least one second video into a composite video stream based upon the unused onscreen location, and the composite video stream may be transmitted to the end user device.

20 Claims, 19 Drawing Sheets

(56) References Cited

U.S. PATENT DOCUMENTS

| | | |
|---|---|---|
| 4,496,976 A | 1/1985 | Swanson et al. |
| 4,520,356 A | 5/1985 | O'Keefe et al. |
| 4,520,921 A | 6/1985 | Vissing |
| 4,567,512 A | 1/1986 | Abraham |
| RE32,187 E | 6/1986 | Barda et al. |
| 4,600,921 A | 7/1986 | Thomas |
| 4,633,297 A | 12/1986 | Skerlos et al. |
| 4,706,121 A | 11/1987 | Young |
| 4,712,239 A | 12/1987 | Frezza et al. |
| 4,734,764 A | 3/1988 | Pocock et al. |
| 4,739,318 A | 4/1988 | Cohen |
| 4,742,344 A | 5/1988 | Nakagawa et al. |
| 4,745,468 A | 5/1988 | Von Kohorn |
| 4,751,578 A | 6/1988 | Reiter et al. |
| 4,792,848 A | 12/1988 | Nussrallah et al. |
| 4,792,849 A | 12/1988 | McCalley et al. |
| 4,829,372 A | 5/1989 | McCalley et al. |
| 4,829,569 A | 5/1989 | Seth-Smith et al. |
| 4,847,825 A | 7/1989 | Levine |
| 4,860,123 A | 8/1989 | McCalley et al. |
| 4,866,770 A | 9/1989 | Seth-Smith et al. |
| 4,876,592 A | 10/1989 | Von Kohorn |
| 4,884,267 A | 11/1989 | Miyamoto et al. |
| 4,885,775 A | 12/1989 | Lucas |
| 4,890,321 A | 12/1989 | Seth-Smith et al. |
| 4,905,094 A | 2/1990 | Pocock et al. |
| 4,908,713 A | 3/1990 | Levine |
| 4,926,255 A | 5/1990 | Von Kohorn |
| 4,941,040 A | 7/1990 | Pocock et al. |
| 4,963,994 A | 10/1990 | Levine |
| 4,977,455 A | 12/1990 | Young |
| 4,991,011 A | 2/1991 | Johnson et al. |
| 4,994,908 A | 2/1991 | Kuban et al. |
| 4,994,909 A | 2/1991 | Graves et al. |
| 5,014,125 A | 5/1991 | Pocock et al. |
| 5,027,400 A | 6/1991 | Baji et al. |
| 5,034,807 A | 7/1991 | Von Kohorn |
| 5,038,211 A | 8/1991 | Hallenbeck |
| 5,057,915 A | 10/1991 | Von Kohorn |
| 5,058,160 A | 10/1991 | Banker et al. |
| 5,070,400 A | 12/1991 | Lieberman |
| 5,109,279 A | 4/1992 | Ando |
| 5,113,496 A | 5/1992 | McCalley et al. |
| 5,119,188 A | 6/1992 | McCalley et al. |
| 5,123,046 A | 6/1992 | Levine |
| 5,128,752 A | 7/1992 | Von Kohorn |
| 5,130,792 A | 7/1992 | Tindell et al. |
| 5,146,210 A | 9/1992 | Heberle |
| 5,151,789 A | 9/1992 | Young |
| 5,153,763 A | 10/1992 | Pidgeon |
| 5,182,640 A | 1/1993 | Takano |
| 5,191,410 A | 3/1993 | McCalley et al. |
| 5,195,092 A | 3/1993 | Wilson et al. |
| 5,208,665 A | 5/1993 | McCalley et al. |
| 5,227,874 A | 7/1993 | Von Kohorn |
| 5,231,665 A | 7/1993 | Auld et al. |
| 5,239,540 A | 8/1993 | Rovira et al. |
| 5,247,364 A | 9/1993 | Banker et al. |
| 5,249,044 A | 9/1993 | Von Kohorn |
| 5,260,778 A | 11/1993 | Kauffman et al. |
| 5,270,688 A | 12/1993 | Dawson et al. |
| 5,270,809 A | 12/1993 | Gammie et al. |
| 5,283,734 A | 2/1994 | Von Kohorn |
| 5,293,357 A | 3/1994 | Hallenbeck |
| 5,297,204 A | 3/1994 | Levine |
| 5,301,028 A | 4/1994 | Banker et al. |
| 5,303,295 A | 4/1994 | West et al. |
| 5,307,173 A | 4/1994 | Yuen et al. |
| 5,317,391 A | 5/1994 | Banker et al. |
| 5,319,454 A | 6/1994 | Schutte |
| 5,319,455 A | 6/1994 | Hoarty et al. |
| 5,319,707 A | 6/1994 | Wasilewski et al. |
| 5,335,079 A | 8/1994 | Yuen et al. |
| 5,351,075 A | 9/1994 | Herz et al. |
| 5,353,121 A | 10/1994 | Young et al. |
| 5,357,276 A | 10/1994 | Banker et al. |
| 5,359,601 A | 10/1994 | Wasilewski et al. |
| 5,361,091 A | 11/1994 | Hoarty et al. |
| 5,365,282 A | 11/1994 | Levine |
| 5,373,330 A | 12/1994 | Levine |
| 5,376,969 A | 12/1994 | Zdepski |
| 5,382,983 A | 1/1995 | Kwoh et al. |
| 5,400,401 A | 3/1995 | Wasilewski et al. |
| 5,400,402 A | 3/1995 | Garfinkle |
| 5,406,558 A | 4/1995 | Rovira et al. |
| 5,410,367 A | 4/1995 | Zahavi et al. |
| 5,414,448 A | 5/1995 | Wada et al. |
| 5,414,756 A | 5/1995 | Levine |
| 5,420,647 A | 5/1995 | Levine |
| 5,420,866 A | 5/1995 | Wasilewski |
| 5,422,674 A | 6/1995 | Hooper et al. |
| 5,428,404 A | 6/1995 | Ingram et al. |
| 5,438,370 A | 8/1995 | Primiano et al. |
| 5,440,632 A | 8/1995 | Bacon et al. |
| 5,448,568 A | 9/1995 | Delpuch et al. |
| 5,473,609 A | 12/1995 | Chaney |
| 5,473,704 A | 12/1995 | Abe |
| 5,475,382 A | 12/1995 | Yuen et al. |
| 5,477,262 A | 12/1995 | Banker et al. |
| 5,479,266 A | 12/1995 | Young et al. |
| 5,479,268 A | 12/1995 | Young et al. |
| 5,481,542 A | 1/1996 | Logston et al. |
| 5,483,287 A | 1/1996 | Siracusa |
| 5,485,197 A | 1/1996 | Hoarty |
| 5,485,221 A | 1/1996 | Banker et al. |
| 5,488,409 A | 1/1996 | Yuen et al. |
| 5,493,339 A | 2/1996 | Birch et al. |
| 5,493,638 A | 2/1996 | Hooper et al. |
| 5,500,933 A | 3/1996 | Schnorf |
| 5,502,504 A | 3/1996 | Marshall et al. |
| 5,508,815 A | 4/1996 | Levine |
| 5,515,106 A | 5/1996 | Chaney et al. |
| 5,515,173 A | 5/1996 | Mankovitz et al. |
| 5,517,257 A | 5/1996 | Dunn et al. |
| 5,523,794 A | 6/1996 | Mankovitz et al. |
| 5,523,796 A | 6/1996 | Marshall et al. |
| 5,526,034 A | 6/1996 | Hoarty et al. |
| 5,530,754 A | 6/1996 | Garfinkle |
| 5,532,732 A | 7/1996 | Yuen et al. |
| 5,532,754 A | 7/1996 | Young et al. |
| 5,534,944 A | 7/1996 | Egawa et al. |
| 5,539,391 A | 7/1996 | Yuen |
| 5,539,822 A | 7/1996 | Lett |
| 5,543,852 A | 8/1996 | Yuen et al. |
| 5,543,853 A | 8/1996 | Haskell et al. |
| 5,544,161 A | 8/1996 | Bigham et al. |
| 5,550,576 A | 8/1996 | Klosterman |
| 5,550,863 A | 8/1996 | Yurt et al. |
| 5,552,837 A | 9/1996 | Mankovitz |
| 5,553,123 A | 9/1996 | Chan et al. |
| 5,559,548 A | 9/1996 | Davis et al. |
| 5,559,549 A | 9/1996 | Hendricks et al. |
| 5,559,550 A | 9/1996 | Mankovitz |
| 5,559,870 A | 9/1996 | Patton et al. |
| 5,568,272 A | 10/1996 | Levine |
| 5,579,055 A | 11/1996 | Hamilton et al. |
| 5,579,057 A | 11/1996 | Banker et al. |
| 5,581,614 A | 12/1996 | Ng et al. |
| 5,583,560 A | 12/1996 | Florin et al. |
| 5,583,576 A | 12/1996 | Perlman et al. |
| 5,583,863 A | 12/1996 | Darr, Jr. et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,598,415 A | 1/1997 | Nuber et al. |
| 5,598,525 A | 1/1997 | Nally et al. |
| 5,600,364 A | 2/1997 | Hendricks et al. |
| 5,600,378 A | 2/1997 | Wasilewski |
| 5,600,711 A | 2/1997 | Yuen |
| 5,604,528 A | 2/1997 | Edwards et al. |

(56) References Cited

U.S. PATENT DOCUMENTS

| | | |
|---|---|---|
| 5,619,247 A | 4/1997 | Russo |
| 5,619,249 A | 4/1997 | Billock et al. |
| 5,619,269 A | 4/1997 | Lee et al. |
| 5,619,274 A | 4/1997 | Roop et al. |
| 5,619,337 A | 4/1997 | Naimpally |
| 5,619,383 A | 4/1997 | Ngai |
| 5,621,579 A | 4/1997 | Yuen |
| 5,623,308 A | 4/1997 | Civanlar et al. |
| 5,625,405 A | 4/1997 | DuLac et al. |
| 5,625,406 A | 4/1997 | Newberry et al. |
| 5,630,119 A | 5/1997 | Aristides et al. |
| 5,633,683 A | 5/1997 | Rosengren et al. |
| 5,633,810 A | 5/1997 | Mandal et al. |
| 5,635,978 A | 6/1997 | Alten et al. |
| 5,635,989 A | 6/1997 | Rothmuller |
| 5,639,350 A | 6/1997 | Aula et al. |
| 5,644,354 A | 7/1997 | Thompson et al. |
| 5,652,614 A | 7/1997 | Okabayashi |
| 5,652,615 A | 7/1997 | Bryant et al. |
| 5,657,072 A | 8/1997 | Aristides et al. |
| 5,659,350 A | 8/1997 | Hendricks et al. |
| 5,659,367 A | 8/1997 | Yuen |
| 5,666,487 A | 9/1997 | Goodman et al. |
| 5,666,645 A | 9/1997 | Thomas et al. |
| 5,668,599 A | 9/1997 | Cheney et al. |
| 5,673,089 A | 9/1997 | Yuen et al. |
| 5,675,575 A | 10/1997 | Wall, Jr. et al. |
| 5,682,511 A | 10/1997 | Sposato et al. |
| 5,684,525 A | 11/1997 | Klosterman |
| 5,687,331 A | 11/1997 | Volk et al. |
| 5,692,214 A | 11/1997 | Levine |
| 5,694,176 A | 12/1997 | Bruette et al. |
| 5,699,107 A | 12/1997 | Lawler et al. |
| 5,701,383 A | 12/1997 | Russo et al. |
| 5,701,610 A | 12/1997 | Hsu |
| 5,703,877 A | 12/1997 | Nuber et al. |
| 5,710,601 A | 1/1998 | Marshall et al. |
| 5,710,610 A | 1/1998 | Kim |
| 5,714,273 A | 2/1998 | Wake et al. |
| 5,715,515 A | 2/1998 | Akins, III et al. |
| 5,716,273 A | 2/1998 | Yuen |
| 5,719,646 A | 2/1998 | Kikuchi et al. |
| 5,724,203 A | 3/1998 | Kwoh et al. |
| 5,724,525 A | 3/1998 | Beyers, II et al. |
| 5,724,543 A | 3/1998 | Ozden et al. |
| 5,724,646 A | 3/1998 | Ganek et al. |
| 5,727,060 A | 3/1998 | Young |
| 5,729,549 A | 3/1998 | Kostreski et al. |
| 5,731,844 A | 3/1998 | Rauch et al. |
| 5,732,217 A | 3/1998 | Emura |
| 5,734,589 A | 3/1998 | Kostreski et al. |
| 5,734,853 A | 3/1998 | Hendricks et al. |
| 5,745,710 A | 4/1998 | Clanton, III et al. |
| 5,751,282 A | 5/1998 | Girard et al. |
| 5,754,783 A | 5/1998 | Mendelson et al. |
| 5,754,940 A | 5/1998 | Smith et al. |
| 5,757,416 A | 5/1998 | Birch et al. |
| 5,758,257 A | 5/1998 | Herz et al. |
| 5,758,259 A | 5/1998 | Lawler |
| 5,764,739 A | 6/1998 | Patton et al. |
| 5,768,491 A | 6/1998 | Lobodzinski et al. |
| 5,768,539 A | 6/1998 | Metz et al. |
| 5,768,551 A | 6/1998 | Bleiweiss et al. |
| 5,771,064 A | 6/1998 | Lett |
| 5,780,474 A | 7/1998 | Peglion et al. |
| 5,781,228 A | 7/1998 | Sposato |
| 5,781,245 A | 7/1998 | Van Der Weij et al. |
| 5,784,095 A | 7/1998 | Robbins et al. |
| 5,790,172 A | 8/1998 | Imanaka |
| 5,790,198 A | 8/1998 | Roop et al. |
| 5,790,806 A | 8/1998 | Koperda |
| 5,793,364 A | 8/1998 | Bolanos et al. |
| 5,793,410 A | 8/1998 | Rao |
| 5,793,438 A | 8/1998 | Bedard |
| 5,798,785 A | 8/1998 | Hendricks et al. |
| 5,801,747 A | 9/1998 | Bedard |
| 5,801,753 A | 9/1998 | Eyer et al. |
| 5,801,785 A | 9/1998 | Crump et al. |
| 5,801,787 A | 9/1998 | Schein et al. |
| 5,802,063 A | 9/1998 | Deiss |
| 5,805,155 A | 9/1998 | Allibhoy et al. |
| 5,805,204 A | 9/1998 | Thompson et al. |
| 5,805,762 A | 9/1998 | Boyce et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,812,754 A | 9/1998 | Lui et al. |
| 5,815,145 A | 9/1998 | Matthews, III |
| 5,818,438 A | 10/1998 | Howe et al. |
| 5,818,439 A | 10/1998 | Nagasaka et al. |
| 5,822,014 A | 10/1998 | Steyer et al. |
| 5,822,123 A | 10/1998 | Davis et al. |
| 5,822,324 A | 10/1998 | Kostresti et al. |
| 5,826,110 A | 10/1998 | Ozden et al. |
| 5,828,420 A | 10/1998 | Marshall et al. |
| 5,828,945 A | 10/1998 | Klosterman |
| RE35,954 E | 11/1998 | Levine |
| 5,835,792 A | 11/1998 | Wise et al. |
| 5,838,383 A | 11/1998 | Chimoto et al. |
| 5,838,678 A | 11/1998 | Davis et al. |
| 5,838,873 A | 11/1998 | Blatter et al. |
| 5,841,433 A | 11/1998 | Chaney |
| 5,844,600 A | 12/1998 | Kerr |
| 5,844,620 A | 12/1998 | Coleman et al. |
| 5,847,771 A | 12/1998 | Cloutier et al. |
| 5,850,218 A | 12/1998 | LaJoie et al. |
| 5,850,232 A | 12/1998 | Engstrom et al. |
| 5,852,478 A | 12/1998 | Kwoh |
| 5,854,840 A | 12/1998 | Cannella, Jr. |
| 5,859,660 A | 1/1999 | Perkins et al. |
| 5,859,949 A | 1/1999 | Yanagihara |
| 5,861,881 A | 1/1999 | Freeman et al. |
| 5,861,906 A | 1/1999 | Dunn et al. |
| 5,867,208 A | 2/1999 | McLaren |
| 5,870,150 A | 2/1999 | Yuen |
| 5,870,474 A | 2/1999 | Wasilewski et al. |
| 5,880,768 A | 3/1999 | Lemmons et al. |
| 5,892,508 A | 4/1999 | Howe et al. |
| 5,894,328 A | 4/1999 | Negishi |
| 5,903,314 A | 5/1999 | Niijima et al. |
| 5,903,816 A | 5/1999 | Broadwin et al. |
| 5,905,497 A | 5/1999 | Vaughan et al. |
| 5,907,323 A | 5/1999 | Lawler et al. |
| 5,914,757 A | 6/1999 | Dean et al. |
| 5,915,068 A | 6/1999 | Levine |
| 5,917,830 A | 6/1999 | Chen et al. |
| 5,926,230 A | 7/1999 | Niijima et al. |
| 5,931,908 A | 8/1999 | Gerba et al. |
| 5,933,141 A | 8/1999 | Smith |
| 5,940,073 A | 8/1999 | Klosterman et al. |
| 5,940,738 A | 8/1999 | Rao |
| 5,945,987 A | 8/1999 | Dunn |
| 5,949,476 A | 9/1999 | Pocock et al. |
| 5,949,792 A | 9/1999 | Yasuda et al. |
| 5,951,639 A | 9/1999 | MacInnis |
| 5,956,088 A | 9/1999 | Shen et al. |
| 5,965,088 A | 10/1999 | Lever et al. |
| 5,966,120 A | 10/1999 | Arazi et al. |
| 5,966,162 A | 10/1999 | Goode et al. |
| 5,978,043 A | 11/1999 | Blonstein et al. |
| 5,978,855 A | 11/1999 | Metz et al. |
| 5,982,445 A | 11/1999 | Eyer et al. |
| 5,986,650 A | 11/1999 | Ellis et al. |
| 5,987,245 A | 11/1999 | Gish |
| 5,990,927 A | 11/1999 | Hendricks et al. |
| 5,990,972 A | 11/1999 | Bond-Harris et al. |
| 5,991,799 A | 11/1999 | Yen et al. |
| 5,995,095 A | 11/1999 | Ratakonda |
| 5,999,173 A | 12/1999 | Ubillos |
| 6,002,394 A | 12/1999 | Schein et al. |
| 6,002,444 A | 12/1999 | Marshall et al. |
| 6,005,561 A | 12/1999 | Hawkins et al. |

(56) References Cited

U.S. PATENT DOCUMENTS

| | | |
|---|---|---|
| 6,005,562 A | 12/1999 | Shiga et al. |
| 6,005,565 A | 12/1999 | Legall et al. |
| 6,005,601 A | 12/1999 | Ohkura et al. |
| 6,005,631 A | 12/1999 | Anderson et al. |
| 6,006,256 A | 12/1999 | Zdepski et al. |
| 6,008,803 A | 12/1999 | Rowe et al. |
| 6,014,184 A | 1/2000 | Knee et al. |
| 6,014,368 A | 1/2000 | Sanami |
| 6,016,144 A | 1/2000 | Blonstein et al. |
| 6,018,372 A | 1/2000 | Etheredge |
| 6,022,223 A | 2/2000 | Taniguchi et al. |
| 6,025,837 A | 2/2000 | Matthews, III et al. |
| 6,029,045 A | 2/2000 | Picco et al. |
| 6,034,677 A | 3/2000 | Noguchi et al. |
| 6,038,000 A | 3/2000 | Hurst, Jr. |
| 6,040,867 A | 3/2000 | Bando et al. |
| 6,044,396 A | 3/2000 | Adams |
| 6,049,831 A | 4/2000 | Gardell et al. |
| 6,061,097 A | 5/2000 | Satterfield |
| 6,061,399 A | 5/2000 | Lyons et al. |
| 6,061,451 A | 5/2000 | Muratani et al. |
| 6,062,868 A | 5/2000 | Toriumi |
| 6,064,376 A | 5/2000 | Berezowski et al. |
| 6,075,575 A | 6/2000 | Schein et al. |
| 6,104,391 A | 8/2000 | Johnston, Jr. et al. |
| 6,118,449 A | 9/2000 | Rosen et al. |
| 6,128,009 A | 10/2000 | Ohkura et al. |
| 6,130,898 A | 10/2000 | Kostreski et al. |
| 6,131,161 A | 10/2000 | Linnartz |
| 6,141,003 A | 10/2000 | Chor et al. |
| 6,141,385 A | 10/2000 | Yamaji |
| 6,141,448 A | 10/2000 | Khansari et al. |
| 6,147,714 A | 11/2000 | Terasawa et al. |
| 6,151,059 A | 11/2000 | Schein et al. |
| 6,154,203 A | 11/2000 | Yuen et al. |
| 6,157,673 A | 12/2000 | Cuccia |
| 6,160,545 A | 12/2000 | Eyer et al. |
| 6,160,546 A | 12/2000 | Thompson et al. |
| 6,163,316 A | 12/2000 | Killian |
| 6,163,345 A | 12/2000 | Noguchi et al. |
| 6,167,188 A | 12/2000 | Young et al. |
| 6,169,843 B1 | 1/2001 | Lenihan et al. |
| 6,172,674 B1 | 1/2001 | Etheredge |
| 6,172,677 B1 | 1/2001 | Stautner et al. |
| 6,172,687 B1 | 1/2001 | Kitamura et al. |
| 6,173,330 B1 | 1/2001 | Guo et al. |
| 6,177,930 B1 | 1/2001 | Chernock et al. |
| 6,177,931 B1 | 1/2001 | Alexander et al. |
| 6,182,287 B1 | 1/2001 | Schneidewend et al. |
| 6,188,725 B1 | 2/2001 | Sugiyama |
| 6,191,782 B1 | 2/2001 | Mori et al. |
| 6,198,478 B1 | 3/2001 | Ota et al. |
| 6,201,536 B1 | 3/2001 | Hendricks et al. |
| 6,208,335 B1 | 3/2001 | Gordon et al. |
| 6,209,129 B1 | 3/2001 | Carr et al. |
| 6,209,130 B1 | 3/2001 | Rector, Jr. et al. |
| 6,212,680 B1 | 4/2001 | Tsinberg et al. |
| 6,212,860 B1 | 4/2001 | Preisner et al. |
| 6,222,531 B1 | 4/2001 | Smith |
| 6,230,322 B1 | 5/2001 | Saib et al. |
| 6,230,324 B1 | 5/2001 | Tomita et al. |
| 6,236,804 B1 | 5/2001 | Tozaki et al. |
| 6,239,794 B1 | 5/2001 | Yuen et al. |
| 6,240,555 B1 | 5/2001 | Shoff et al. |
| 6,243,142 B1 | 6/2001 | Mugura et al. |
| 6,256,785 B1 | 7/2001 | Klappert et al. |
| 6,259,487 B1 | 7/2001 | Bril |
| 6,260,192 B1 | 7/2001 | Rosin et al. |
| 6,262,722 B1 | 7/2001 | Allison et al. |
| 6,263,501 B1 | 7/2001 | Schein et al. |
| 6,268,849 B1 | 7/2001 | Boyer et al. |
| 6,288,738 B1 | 9/2001 | Dureau et al. |
| 6,298,482 B1 | 10/2001 | Seidman et al. |
| 6,305,016 B1 | 10/2001 | Marshall et al. |
| 6,357,043 B1 | 3/2002 | Ellis et al. |
| 6,357,046 B1 | 3/2002 | Thompson et al. |
| 6,359,910 B1 | 3/2002 | Takahashi |
| 6,385,771 B1 | 5/2002 | Gordon |
| 6,388,714 B1 | 5/2002 | Schein et al. |
| 6,389,477 B1 | 5/2002 | Simmon et al. |
| 6,401,242 B1 | 6/2002 | Eyer et al. |
| 6,404,818 B1 | 6/2002 | Obikane |
| 6,405,371 B1 | 6/2002 | Oosterhout et al. |
| 6,414,970 B1 | 7/2002 | Negishi et al. |
| 6,415,437 B1 | 7/2002 | Ludvig et al. |
| 6,421,067 B1 | 7/2002 | Kamen et al. |
| 6,421,359 B1 | 7/2002 | Bennett et al. |
| 6,425,133 B1 | 7/2002 | Leary |
| 6,426,779 B1 | 7/2002 | Noguchi et al. |
| 6,442,755 B1 | 8/2002 | Lemmons et al. |
| 6,449,654 B1 | 9/2002 | Blackwell et al. |
| 6,453,471 B1 | 9/2002 | Klosterman |
| 6,456,782 B1 | 9/2002 | Kubota et al. |
| 6,457,010 B1 | 9/2002 | Eldering et al. |
| 6,459,427 B1 | 10/2002 | Mao et al. |
| 6,460,018 B1 | 10/2002 | Kasai et al. |
| 6,460,181 B1 | 10/2002 | Donnelly |
| 6,463,586 B1 | 10/2002 | Jerding |
| 6,469,753 B1 | 10/2002 | Klosterman et al. |
| 6,470,460 B1 | 10/2002 | Kashiwagi et al. |
| 6,473,425 B1 | 10/2002 | Bellaton et al. |
| 6,473,804 B1 | 10/2002 | Kaiser et al. |
| 6,477,705 B1 | 11/2002 | Yuen et al. |
| 6,481,010 B2 | 11/2002 | Nishikawa et al. |
| 6,481,011 B1 | 11/2002 | Lemmons |
| 6,481,012 B1 | 11/2002 | Gordon et al. |
| 6,487,722 B1 | 11/2002 | Okura et al. |
| 6,490,728 B1 | 12/2002 | Kitazato et al. |
| 6,510,152 B1 | 1/2003 | Gerszberg et al. |
| 6,510,555 B1 | 1/2003 | Tsurumoto |
| 6,515,680 B1 | 2/2003 | Hendricks et al. |
| 6,518,986 B1 | 2/2003 | Mugura |
| 6,519,009 B1 | 2/2003 | Hanaya et al. |
| 6,526,577 B1 | 2/2003 | Knudson et al. |
| 6,530,082 B1 | 3/2003 | Del Sesto et al. |
| 6,532,590 B1 | 3/2003 | Chimoto |
| 6,542,518 B1 | 4/2003 | Miyazawa |
| 6,567,106 B1 | 5/2003 | Wugofski |
| 6,573,942 B1 | 6/2003 | Crinon |
| 6,577,350 B1 | 6/2003 | Proehl et al. |
| 6,578,201 B1 | 6/2003 | LaRocca et al. |
| 6,580,441 B2 | 6/2003 | Schileru-Key |
| 6,584,125 B1 | 6/2003 | Katto |
| 6,584,153 B1 | 6/2003 | Comito et al. |
| 6,588,014 B1 | 7/2003 | Hayashi |
| 6,594,271 B1 | 7/2003 | Wu et al. |
| 6,606,746 B1 | 8/2003 | Zdepski et al. |
| 6,621,870 B1 | 9/2003 | Gordon et al. |
| 6,625,810 B1 | 9/2003 | Murphy et al. |
| 6,637,029 B1 | 10/2003 | Maissel et al. |
| 6,651,252 B1 | 11/2003 | Gordon et al. |
| 6,671,882 B1 | 12/2003 | Murphy et al. |
| 6,675,385 B1 | 1/2004 | Wang |
| 6,675,387 B1 | 1/2004 | Boucher et al. |
| 6,681,395 B1 | 1/2004 | Nishi |
| 6,704,028 B2 | 3/2004 | Wugofski |
| 6,704,359 B1 | 3/2004 | Bayrakeri et al. |
| 6,741,617 B2 | 5/2004 | Rosengren et al. |
| 6,754,905 B2 | 6/2004 | Gordon et al. |
| 6,763,522 B1 | 7/2004 | Kondo et al. |
| 6,782,132 B1 | 8/2004 | Fogg |
| 6,791,561 B1 | 9/2004 | Dawson |
| 6,807,528 B1 | 10/2004 | Truman et al. |
| 6,828,993 B1 | 12/2004 | Hendricks et al. |
| 6,874,129 B2 | 3/2005 | Smith |
| 6,954,897 B1 | 10/2005 | Noguchi et al. |
| 6,968,567 B1 | 11/2005 | Gordon et al. |
| 6,999,476 B2 | 2/2006 | Lerman et al. |
| 7,031,348 B1 | 4/2006 | Gazit |
| 7,062,777 B2 | 6/2006 | Alba et al. |
| 7,065,709 B2 | 6/2006 | Ellis et al. |
| 7,096,484 B2 | 8/2006 | Mao et al. |
| 7,100,185 B2 | 8/2006 | Bennington et al. |
| 7,110,006 B2 | 9/2006 | MacInnis et al. |

(56) References Cited

U.S. PATENT DOCUMENTS

| | | | |
|---|---|---|---|
| 7,117,440 B2 | 10/2006 | Gordon et al. | |
| 7,134,133 B1 | 11/2006 | Wugofski | |
| 7,137,135 B2 | 11/2006 | Schein et al. | |
| 7,143,428 B1 | 11/2006 | Bruck et al. | |
| 7,150,029 B1 | 12/2006 | Ebling et al. | |
| 7,174,084 B2 | 2/2007 | Edmonds et al. | |
| 7,178,158 B2 | 2/2007 | Nishina et al. | |
| 7,194,032 B1 | 3/2007 | Easwar et al. | |
| 7,343,614 B1 | 3/2008 | Hendricks et al. | |
| 7,359,439 B1 | 4/2008 | Conover | |
| 7,363,645 B1 | 4/2008 | Hendricks | |
| 7,370,342 B2 | 5/2008 | Ismail et al. | |
| 7,404,200 B1 | 7/2008 | Hailey et al. | |
| 7,503,003 B2 | 3/2009 | Kamen et al. | |
| 7,685,619 B1 | 3/2010 | Herz | |
| 7,836,467 B2 | 11/2010 | Gordon et al. | |
| 7,838,467 B2 | 11/2010 | Jones et al. | |
| 8,032,906 B2 | 10/2011 | Gordon et al. | |
| 8,060,905 B1 | 11/2011 | Hendricks | |
| 2001/0005447 A1 | 6/2001 | Kawamura et al. | |
| 2001/0010095 A1 | 7/2001 | Ellis et al. | |
| 2001/0012022 A1 | 8/2001 | Smith | |
| 2001/0056577 A1 | 12/2001 | Gordon et al. | |
| 2002/0007493 A1 | 1/2002 | Butler et al. | |
| 2002/0012353 A1 | 1/2002 | Gerszberg et al. | |
| 2002/0026496 A1 | 2/2002 | Boyer et al. | |
| 2002/0032907 A1 | 3/2002 | Daniels | |
| 2002/0035728 A1 | 3/2002 | Fries | |
| 2002/0049971 A1 | 4/2002 | Augenbraun et al. | |
| 2002/0066102 A1 | 5/2002 | Chapman et al. | |
| 2002/0066103 A1 | 5/2002 | Gagnon et al. | |
| 2002/0120933 A1 | 8/2002 | Knudson et al. | |
| 2002/0133565 A1* | 9/2002 | Huat | 709/218 |
| 2003/0020744 A1 | 1/2003 | Ellis et al. | |
| 2003/0034982 A1 | 2/2003 | Talayssat et al. | |
| 2003/0035983 A1 | 2/2003 | Wugofski | |
| 2003/0052905 A1 | 3/2003 | Gordon et al. | |
| 2003/0056216 A1 | 3/2003 | Wugofski et al. | |
| 2003/0066085 A1 | 4/2003 | Boyer et al. | |
| 2003/0083533 A1 | 5/2003 | Gerba et al. | |
| 2003/0091339 A1 | 5/2003 | Isozaki | |
| 2003/0115603 A1 | 6/2003 | Lemmons et al. | |
| 2003/0149988 A1 | 8/2003 | Ellis et al. | |
| 2003/0193619 A1 | 10/2003 | Farrand | |
| 2003/0200544 A1 | 10/2003 | Ellis et al. | |
| 2003/0209599 A1 | 11/2003 | Gatto | |
| 2004/0078824 A1 | 4/2004 | Krisbergh et al. | |
| 2004/0107439 A1 | 6/2004 | Hassell et al. | |
| 2004/0117831 A1 | 6/2004 | Ellis et al. | |
| 2004/0128686 A1 | 7/2004 | Boyer et al. | |
| 2004/0261105 A1 | 12/2004 | Marshall et al. | |
| 2005/0028208 A1 | 2/2005 | Ellis et al. | |
| 2005/0278741 A1 | 12/2005 | Robarts et al. | |
| 2006/0277581 A1 | 12/2006 | Eliyahu et al. | |
| 2006/0282852 A1 | 12/2006 | Purpura et al. | |
| 2007/0011702 A1 | 1/2007 | Vaysman | |
| 2007/0089135 A1 | 4/2007 | Qureshey et al. | |
| 2007/0157247 A1 | 7/2007 | Cordray et al. | |
| 2008/0115164 A1 | 5/2008 | Kiiskinen | |
| 2009/0028153 A1 | 1/2009 | Koster et al. | |
| 2010/0333004 A1* | 12/2010 | Kristiansen et al. | 715/765 |
| 2011/0209173 A1 | 8/2011 | Vaysman et al. | |
| 2011/0314499 A1 | 12/2011 | Alba et al. | |
| 2013/0152129 A1 | 6/2013 | Alberth et al. | |
| 2013/0174201 A1 | 7/2013 | Tam | |

FOREIGN PATENT DOCUMENTS

| | | | |
|---|---|---|---|
| EP | 0758833 | A2 | 2/1997 |
| EP | 0/838958 | A1 | 4/1998 |
| EP | 0921682 | A2 | 6/1999 |
| EP | 0946060 | A1 | 9/1999 |
| EP | 0966164 | A2 | 12/1999 |
| EP | 01905040 | A1 | 4/2008 |
| GB | 0124726.1 | A | 9/1971 |
| GB | 2364195 | A | 1/2002 |
| JP | 9-284739 | A | 10/1997 |
| JP | 10-191273 | A | 7/1998 |
| JP | 11-163817 | A | 6/1999 |
| JP | H08506939 | | 5/2001 |
| JP | 2001-519625 | A | 10/2001 |
| WO | 94/14280 | A1 | 6/1994 |
| WO | 9414282 | A1 | 6/1994 |
| WO | 94/30008 | A1 | 12/1994 |
| WO | 96/37059 | A1 | 11/1996 |
| WO | 9713368 | A1 | 4/1997 |
| WO | 9746007 | A1 | 12/1997 |
| WO | 9831116 | A2 | 7/1998 |
| WO | 98/47825 | A1 | 10/1998 |
| WO | 9853611 | A1 | 11/1998 |
| WO | 99/04561 | A1 | 1/1999 |
| WO | 0005890 | A1 | 2/2000 |
| WO | 0005892 | A1 | 2/2000 |
| WO | 0040013 | A1 | 7/2000 |
| WO | 0064164 | A1 | 10/2000 |
| WO | 0064169 | A1 | 10/2000 |
| WO | 0156290 | A1 | 8/2001 |

OTHER PUBLICATIONS

Office Action in Canadian patent application No. 2680673. dated May 24, 2011.
Office Action in European Patent Application No. 07007019.8, dated Oct. 21, 2011.
Rule 69 EPC Communication in European Patent Application No. 07016891.9, dated Aug. 9, 2010.
Search Report and Written Opinion in European Patent Application No. 07016891.9-2202, dated Jul. 5, 2010.
Search Report in European Patent Application No. 07007019.8, dated Feb. 11, 2011.
Freier, Alan O. et al., "The SSL Protocol Version 3.0," Mar. 1996, pp. 1-52, Netscape.
Kaliski. Burton S .. "A Layman's Guide to a Subset of ASN.1, BER and DER," Nov. 1, 1993, pp. 1-38, RSA Laboratories.
Malpani, AM Barish et al., "Simple Certificate Validation Protocol (SCVP)," Jul. 2001, pp. 1-23.
PKCS #7: Cryptographic Message Syntax Standard, Nov. 1993, pp. 1-29, RSA Laboratories.
Office Action in European Application No. 07016891.9-2202, dated Apr. 21, 2010.
International Search Report PCT/US99/15522, Oct. 15, 1999.
International Search Report PCT/US00/10187, Jul. 11, 2000.
International Search Report PCT/US01/02440, Aug. 2, 2001.
International Search Report PCT/US97/22850, Oct. 22, 1998.
International Search Report PCT/US99/16265, Feb. 3, 2000.
International Search Report PCT/US99/16786, Oct. 18, 1999.
International Search Report PCT/US99/16764, Oct. 18, 1999.
International Search Report PCT/US00/10059, Jul. 6, 2000.
International Preliminary Examination Report PCT/US00/10059, Sep. 30, 2001.
International Search Report PCT/US00/29806, Jan. 19, 2001.
International Preliminary Examination Report PCT/US00/29806, Nov. 18, 2001.
International Search Report PCT/US00/29805, Jan. 22, 2001.
International Preliminary Examination Report PCT/US00/29805, Nov. 13, 2001.
International Preliminary Examination Report PCT/US00/10188, May 15, 2001.
International Preliminary Examination Report PCT/US99/16786, Dec. 18, 2000.
International Search Report PCT/US00/10188, Jun. 15, 2000.
British Search and Examination Search report—GB 0124726.1— Aug. 8, 2003.
International Preliminary Examination Report PCT/US01/02440, Apr. 15, 2003.

(56) References Cited

OTHER PUBLICATIONS

European Search Report EP01963811, Sep. 22, 2005.
Supplementary European Search Report EP01905040, Feb. 21, 2006.
International Preliminary Examination Report—PCT/US99/15522—Feb. 17, 2000.
Response to European Office Action—EP 99937446.5—Dated May 12, 2015.

* cited by examiner

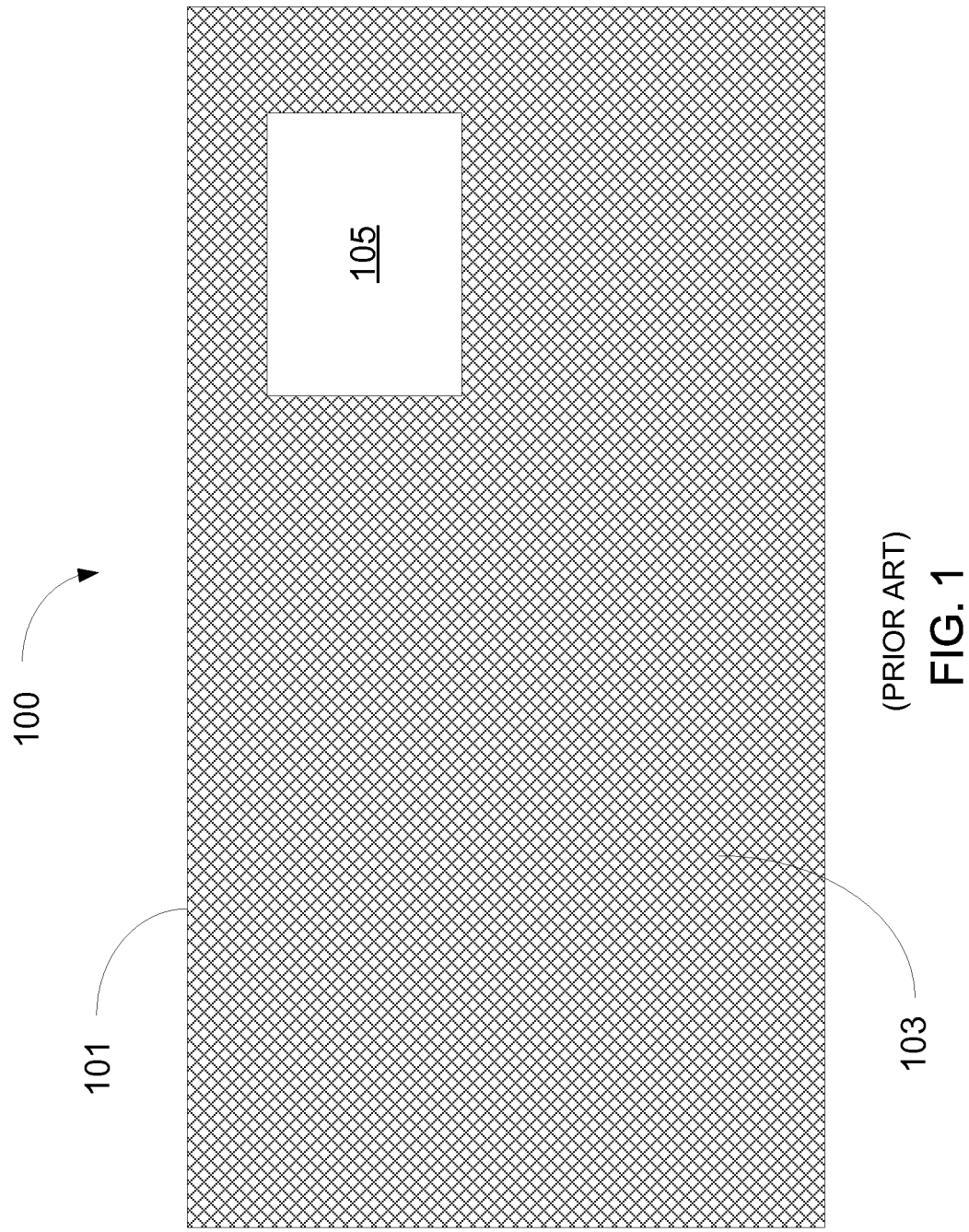

Electronic Program Guide

| Program Channel 780 | Program Channel 781 | Program Channel 782 | Program Channel 783 | Program Channel 784 | Program Channel 785 | Program Channel 786 | Program Channel 787 | Program Channel 788 | Program Channel 789 |
|---|---|---|---|---|---|---|---|---|---|
| | | | | | | | | | |

FIG. 6E

MULTIPLE VIDEO CONTENT IN A COMPOSITE VIDEO STREAM

BACKGROUND

Television distribution systems operate on allowing multiple streams of content to be sent downstream via multiplexing. For digital television channels, through multiplexing, each physical radio frequency (RF) channel can carry several digital streams of video programming material from different services (e.g., HBO, CBS, ESPN, etc.). Traditionally for an end user with a television and/or set top box to receive a signal from a content provider, the end user can only see as many video programs on a screen at one time as there are tuners available on the respective system.

For picture-in-picture capability, the end user traditionally needs two tuners to display two streams of video on a screen simultaneously (since the receiving device is typically configured to only locate and decode one of the streams in the channel, even if multiple streams are multiplexed in that channel). As such, if a multiplexed signal on a single physical RF channel included a program stream for one service (e.g., ESPN) and a program stream for another service (e.g., NBC), an end user would still need at least two tuners associated with her end television to simultaneously display both programs. Such two-tuner systems have included recording devices, such as a video cassette recorder (VCR) device associated with the end television of the user. One tuner in the television may tune to and receive the content stream of one service (e.g., HBO) and a second tuner, in the television or another device such as a VCR, may tune to and receive the content steam of another service (e.g., NBC), and the television or other device may allow for simultaneous display of both content streams (with one appearing in a smaller window on the display of the television).

FIG. 1 is an example of a picture-in-picture screen 100 with two tuners to display two streams of content. The display 101 environment shows content 103 received through the tuner of the television and content 105 received through the tuner of an associated second device, such as a VCR. For each stream of content, a separate tuner is needed in the traditional system.

This kind of dual-image presentation may be used for advertising barker channels. A barker channel is one type of television service or station that has historically been used for advertising and/or promotional purposes. Content and/or service providers may utilize a barker channel for advertising a service offered, such as a sports package of all football games, or promoting a product for sale, such as a continuous infomercial. For example, a user tuning a television to a barker channel may see a continuous, repeating, advertisement for latest video on demand offerings.

A barker channel may include a video and an audio stream where a portion of the content on the screen for the barker channel is the video. The video of a barker channel often only takes a quarter or less of the entire display screen, such as shown in FIG. 2A. However, a full screen video may be transmitted for the channel.

Approaches to transmitting barker channels transmit each barker video, which generally takes up less than a quarter of the entire display, on its own full-sized video stream with the area of the video stream that is unused simply being black. FIGS. 2A-2C illustrate such examples. As shown for each example 200a, 200b, and 200c in FIGS. 2A, 2B, and 2C, respectively, each different barker video 203a, 203b, and 203c, is transmitted to an end user's equipment, such as a television and/or set-top box, as a separate entire video 201a, 201b, and 201c, respectively. The portion of the video 201a, 201b, 201c not used for the barker video 203a, 203b, 203c, respectively, is transmitted as black.

There is always a need for increased bandwidth and/or more efficient usage of existing bandwidth.

SUMMARY

In light of the foregoing background, the following presents a simplified summary of the present disclosure in order to provide a basic understanding of some features of the disclosure. This summary is provided to introduce a selection of concepts in a simplified form that are further described below. This summary is not intended to identify key features or essential features of the disclosure.

In one aspect of the disclosure, a request for a first video may be received from an end user device, such as an interface device (e.g., a set-top box, a digital video recorder (DVR), computing device, etc.). A video display size for the requested first video may be determined. The system may examine unused screen areas of one or more other video signals, and may identify a video signal having unused screen area in which the first video will fit. Information on the unused screen area may be transmitted to a content source of the requested first video. The requested first video may be received from the content source. The requested first video then may be placed into a mosaic with one or more other videos into a composite video stream of the plurality of video streams, and the composite video stream may be transmitted to the end user device as a video mosaic, with the first video positioned in a window on the screen at the determined screen location and at the display size.

In accordance with one or more other aspects of the present disclosure, a request for a first video may be sent from an end user device, the first video request including information on the video size for the requested first video. A composite mosaic video stream may be received at the end user device, the composite mosaic video stream including the requested first video placed with at least one second video. An onscreen location of the requested first video in the received composite mosaic video stream may be determined. The requested first video may be received, extracted from the composite mosaic stream, and the requested first video may be outputted to an output device associated with the end user device.

In accordance with one or more additional aspects of the present disclosure, an unused onscreen location to place the first video may be determined. The unused onscreen location may be within one of a plurality of composite video streams. The unused onscreen location may be determined to be placed based upon a predefined onscreen location of a first video associated with a first service of a television listing. The unused onscreen location may correspond to a location for insertion of video content for output to an onscreen location of an output device. Each composite video stream may be configured to include a plurality of different videos associated with different services of the television listing placed in an unused onscreen location of a composite video stream based upon a predefined onscreen location of a video. The first video may be placed within the predefined onscreen location of the one of the plurality of composite video streams with at least one second video associated with at least a second service of the television listing into the one of the plurality of composite video streams. The placement may be based at least upon said determined unused onscreen location and based upon a predefined onscreen location of the at least second video, The first service and the at least one second service may be different services. The composite video stream may be transmitted to an end user device associated with the output device.

By using a single full resolution high definition (HD) composite stream, or portion of a full resolution HD stream, and dynamically re-arranging currently broadcast barker videos within that HD stream based on user demand, user customized barker videos and dynamically sized barker videos may be provided with efficient use of bandwidth. In accordance with other aspects, a single standard definition (SD) stream, or portion thereof, may be utilized in a similar manner. These and other aspects as discussed in further detail below.

BRIEF DESCRIPTION OF THE DRAWINGS

Some embodiments of the present disclosure are illustrated by way of example, and not by way of limitation, in the figures of the accompanying drawings and in which like reference numerals refer to similar elements.

FIG. 1 illustrates a picture-in-picture display screen;

FIG. 6E illustrates an example electronic program guide in accordance with one or more features of the disclosure herein.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

The disclosure may be operational with numerous general purpose or special purpose computing system environments or configurations. Examples of computing systems, environments, and/or configurations that may be suitable for use with features described herein include, but are not limited to, personal computers, server computers, hand-held or laptop devices, multiprocessor systems, microprocessor-based systems, set top boxes, digital video recorders, programmable consumer electronics, network PCs, minicomputers, mainframe computers, distributed computing environments that include any of the above systems or devices, and the like.

The features may be described and implemented in the general context of computer-executable instructions, such as program modules, being executed by a computer. Generally, program modules include routines, programs, objects, components, data structures, etc. that perform particular tasks or implement particular abstract data types. Features herein may also be practiced in distributed computing environments where tasks are performed by remote processing devices that are linked through a communications network. In a distributed computing environment, program modules may be located in both local and remote computer storage media including memory storage devices.

Figure 2A:
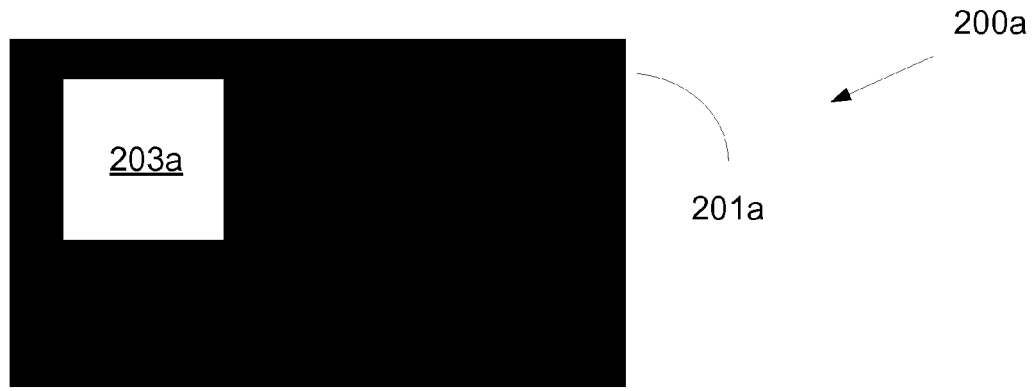
FIGS. 2A-2C illustrate conventional video images including respective barker video images.
Figure 2B:
Figure 2C:
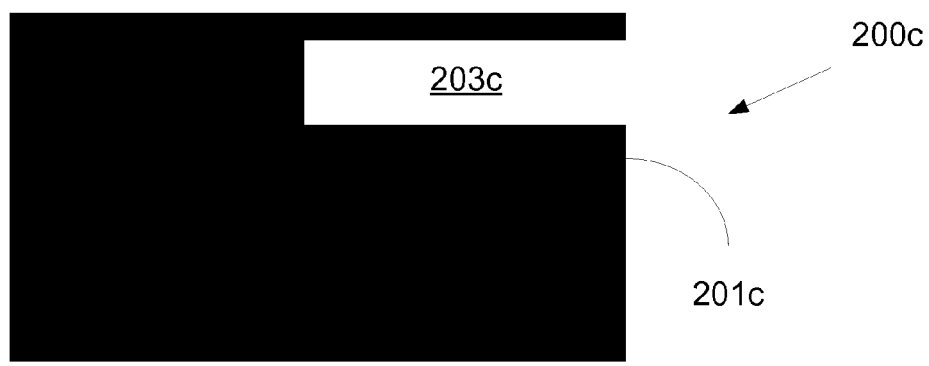
Figure 3:
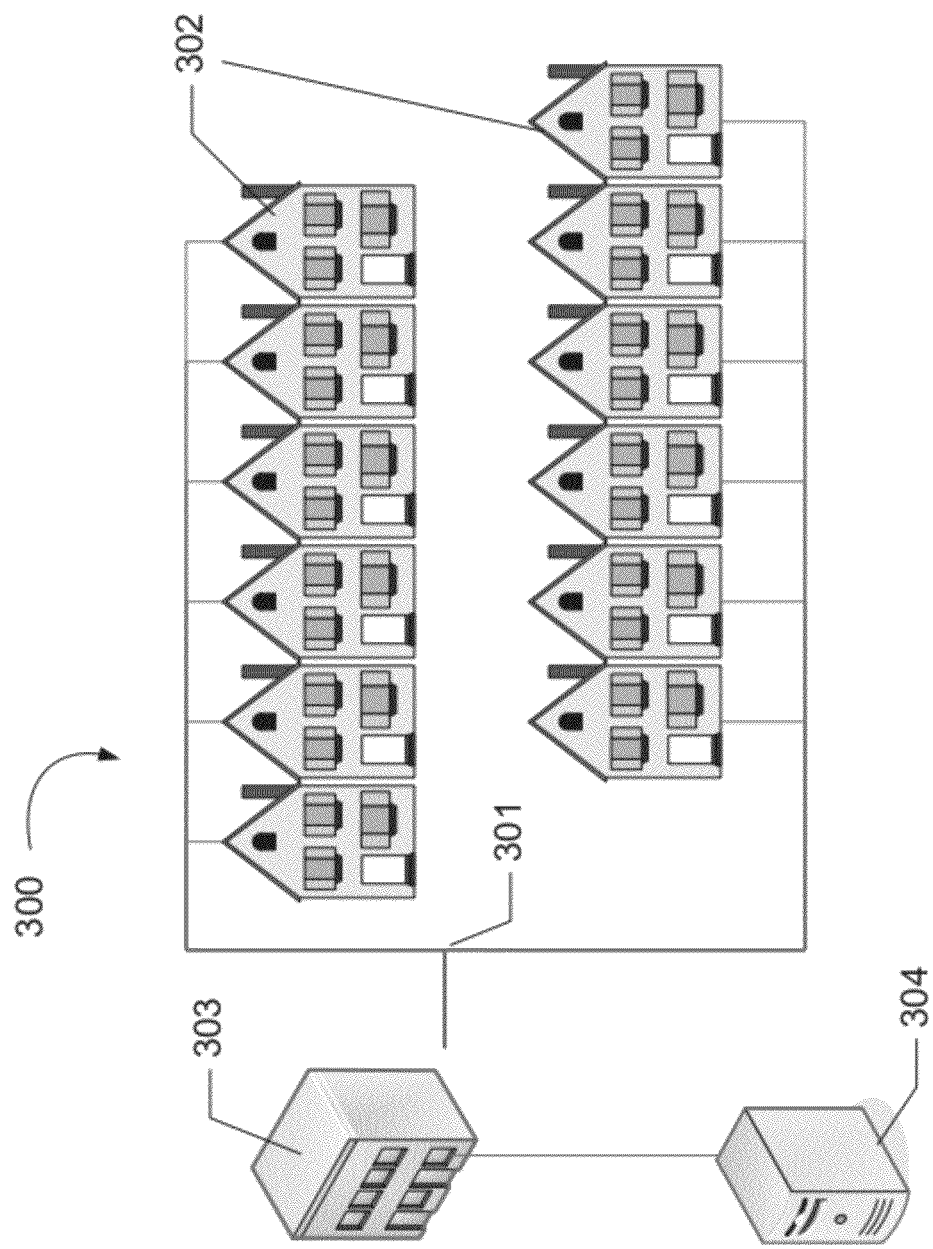
FIG. 3 illustrates an example network on which various features herein may be implemented.

FIG. 3 illustrates an example information distribution network 300 on which many of the various features described herein may be implemented. Network 300 may be any type of information distribution network, such as satellite, telephone, cellular, wireless network, an optical fiber network, a coaxial cable network, hybrid fiber/coax distribution network having wireless links, etc. Such networks 300 use a series of interconnected transmission lines 301, such as optical fibers, coaxial cables, and/or wireless links, to connect multiple premises (e.g., homes) 302 to a provider's central location 303. The central location 303 may transmit downstream information signals onto the lines 301, and each home 302 may have a tuner used to receive and process those signals. A content source 304 is shown operatively connected to the central location 303. Content source 304 may be a database system maintaining one or more objects, files, or signals, such as video images, for transmission to one or more homes 302.

There may be one line originating from the central location 303, and it may be split a number of times to distribute the signal to various homes 302 in the vicinity (which may be many miles) of the central location 303. The lines 301 may include components not illustrated, such as splitters, filters, amplifiers, etc. to help convey the signal clearly, but in general each split introduces a bit of signal degradation. Portions of the lines 301 may also be implemented with fiber-optic cable, while other portions may be implemented with coaxial cable or wireless communication paths.

The central location 303 may include a server configured to handle communications with the homes 302 using whichever communication medium is available. For example, in a coaxial cable or hybrid fiber/coax system, the central location 303 may include a modem termination system (MTS), such as a cable modem termination system (CMTS), which may be a computing device configured to manage communications between devices on the network of lines 301 and backend devices such as content sources (e.g., video on demand servers, television program sources, etc.), headend computers and other networks. The MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 302, and to receive upstream communications from those modems on one or more upstream frequencies, as well as to serve as an interface to devices and networks that are further upstream, such as other Internet devices. Similar types of headend systems may be used for other types of networks, such as an optical fiber termination system for optical media, telephone line DSLAM (Digital Subscriber Line Access Multiplexer) for telephone lines, satellite transceiver, cellular telephone station, local area wireless (e.g., WiMax), etc.

Figure 4:
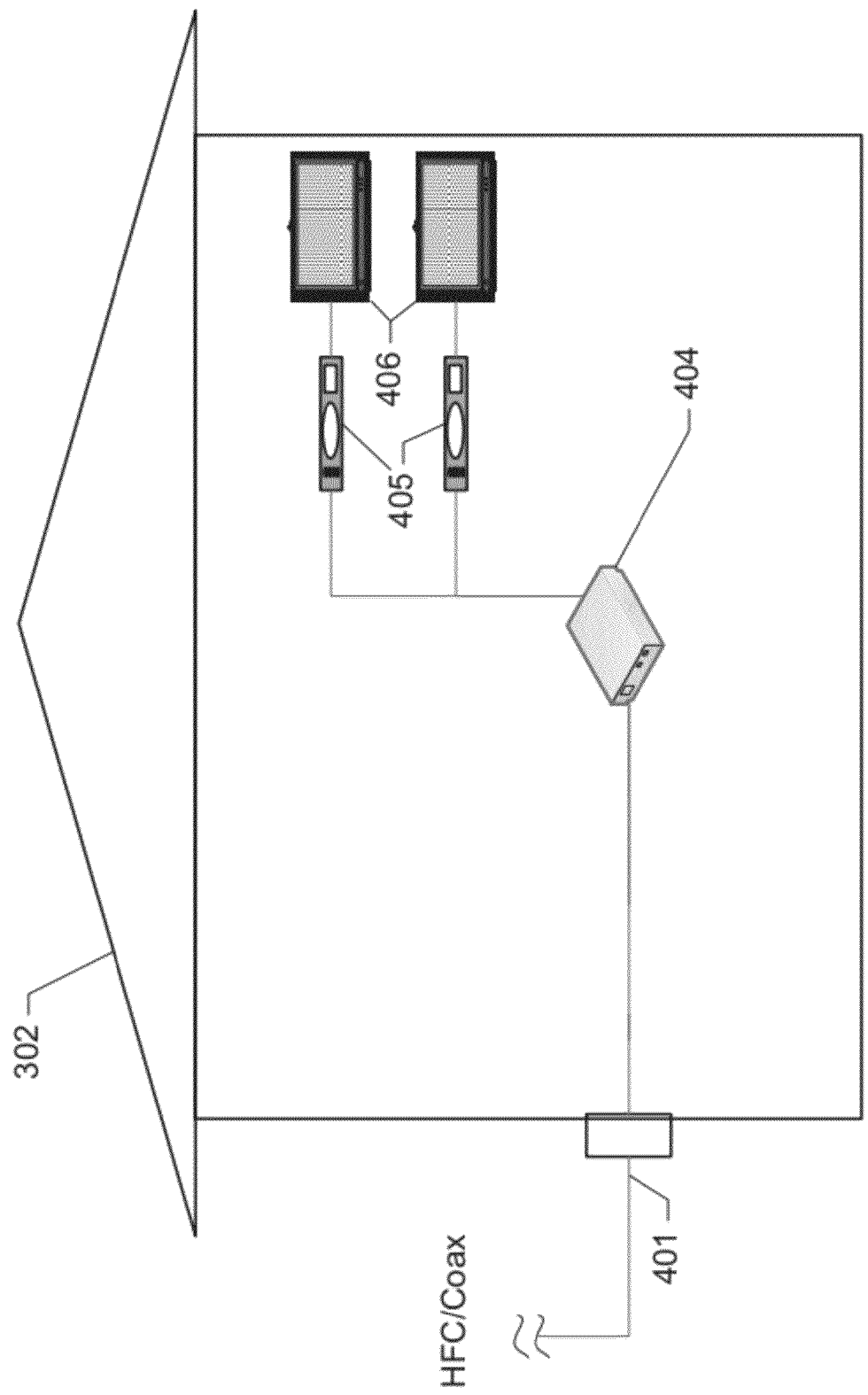
FIG. 4 illustrates an example home with a home gateway and various communication devices.
Figure 5:
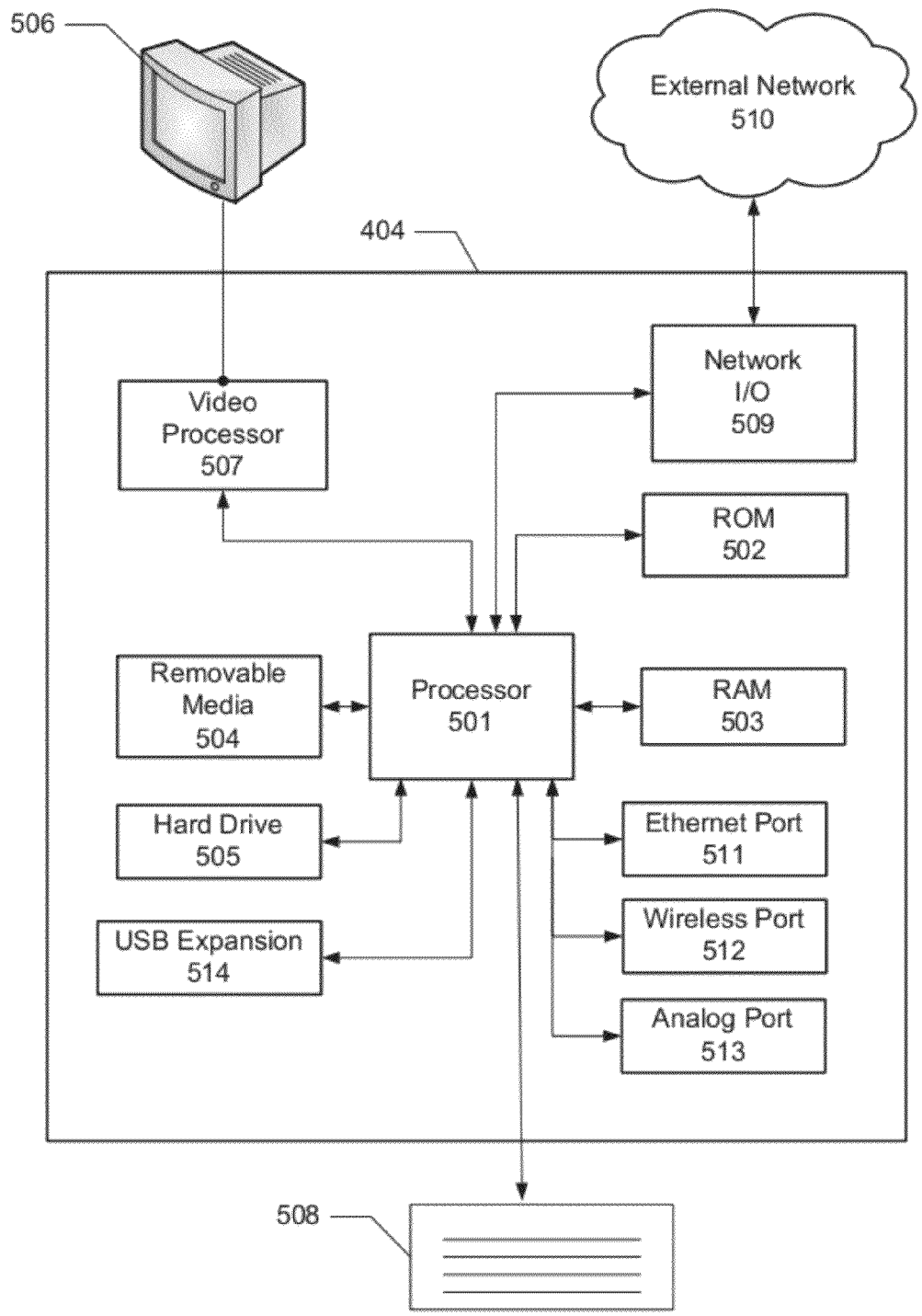
FIG. 5 illustrates an example computing device on which various features described herein may be implemented.

FIG. 4 illustrates a closer view of a home 302 that may be connected to the network 300 via an interface 401. The transmission line (coaxial, fiber, wireless, etc.) may be connected to a home gateway device, e.g., content reception device, 404. The gateway 404 may be a computing device configured to communicate over the network 301 and with the central location 303. The gateway 404 may include, for example, a modem configured to communicate with the termination system at the central location 303. Additional details of an example gateway 404 are shown in FIG. 5, discussed further below.

The gateway 404 may be connected to a variety of devices within the home, and may coordinate communications among those devices, and between the devices and networks outside the home 302. For example, the gateway 404 may include a modem (e.g., a DOCSIS device communicating with CMTS), and may offer Internet connectivity to one or more computers within the home. The connectivity may also be extended to one or more wireless routers. For example, a wireless router may be an IEEE 802.11 router, local cordless telephone (e.g., Digital Enhanced Cordless Telephone—DECT), or any other desired type of wireless network. Various wireless devices within the home, such as a DECT phone (or a DECT interface within a cordless telephone) and portable laptop computer, may communicate with the gateway 404 using a wireless router.

The gateway 404 may also include one or more telephone interfaces, to allow the gateway 404 to communicate with one or more telephones. The telephones may be a traditional analog twisted pair telephone (in which case the gateway 404 may include a twisted pair interface), wireless telephone, or it may be a digital telephone such as a Voice Over Internet Protocol (VoIP) telephone, in which case the phone may simply communicate with the gateway 404 using a digital interface, such as an Ethernet interface.

The gateway 404 may communicate with the various devices within the home using any desired connection and protocol. For example, an in-home MoCA (Multimedia Over Coax Alliance) network may use a home's internal coaxial cable network to distribute signals to the various devices in the homes. Alternatively, some or all of the connections may be of a variety of formats (e.g., MoCA, Ethernet, HDMI, DVI, twisted pair, etc.), depending on the particular end device being used. The connections may also be implemented wirelessly, using local wi-fi, WiMax, Bluetooth, or any other desired wireless format.

The incoming line may also be connected to one or more network interface devices 405, which can be any processing, receiving, and/or displaying device, such as set-top boxes (STBs), digital video recorders (DVRs), gateways, etc., that serve as a network interface between devices in the home and the network 301. The devices 405 may receive and decode content via the line (e.g., optical, coaxial, wireless, etc.), and may provide that content to users for consumption, such as for viewing video content on a television 406. Alternatively, televisions, or other viewing devices 406, may be connected to transmission line 401 directly without a separate interface device, and may perform the functions of the interface device. Any type of content, such as video, video on demand, audio, Internet data etc., can be accessed in this manner. As an alternative, the interface device functionality can be incorporated with the gateway, so that the gateway 404 receives and decodes content from the line, and supplies it to the televisions for display using any desired local home physical interface.

FIG. 5 illustrates a computing device that may be used to implement the gateway 404, although similar components (e.g., processor, memory, computer-readable media, etc.) may be used to implement any of the devices described herein. The gateway 404 may include one or more processors 501, which may execute instructions of a computer program to perform any of the features described herein. Those instructions may be stored in any type of computer-readable medium or memory, to configure the operation of the processor 501. For example, instructions may be stored in a read-only memory (ROM) 502, random access memory (RAM) 503, removable media 504, such as a Universal Serial Bus (USB) drive, compact disc (CD) or digital versatile disc (DVD), floppy disk drive, or any other desired electronic storage medium. Instructions may also be stored in an attached (or internal) hard drive 505.

The gateway 404 may include one or more output devices, such as a display 506 (or an external television connected to a set-top box), and may include one or more output device controllers 507, such as a video processor. There may also be one or more user input devices 508, such as a wired or wireless remote control, keyboard, mouse, touch screen, microphone, etc. The gateway 404 may also include one or more network input/output circuits 509, such as a network card to communicate with an external network 510. The network interface may be a wired interface, wireless interface, or a combination of the two. In some embodiments, the interface 509 may include a modem (e.g., a cable modem), and network 510 may include a television distribution system, such as a coaxial, fiber, or hybrid fiber/coaxial distribution system (e.g., a DOCSIS network).

The gateway 204 may include a variety of communication ports or interfaces to communicate with the various home devices. The ports may include, for example, Ethernet ports 511, wireless interfaces 512, analog ports 513, and any other port used to communicate with devices in the home. The gateway 404 may also include one or more expansion ports 514. The expansion ports 514 may allow the user to insert an expansion module to expand the capabilities of the gateway 404. As an example, the expansion port may be a Universal Serial Bus (USB) port, and can accept various USB expansion devices. The expansion devices may include memory, general purpose and dedicated processors, radios, software and/or I/O modules that add processing capabilities to the gateway 404. The expansions can add any desired type of functionality, several of which are discussed further below.

Figure 6A:
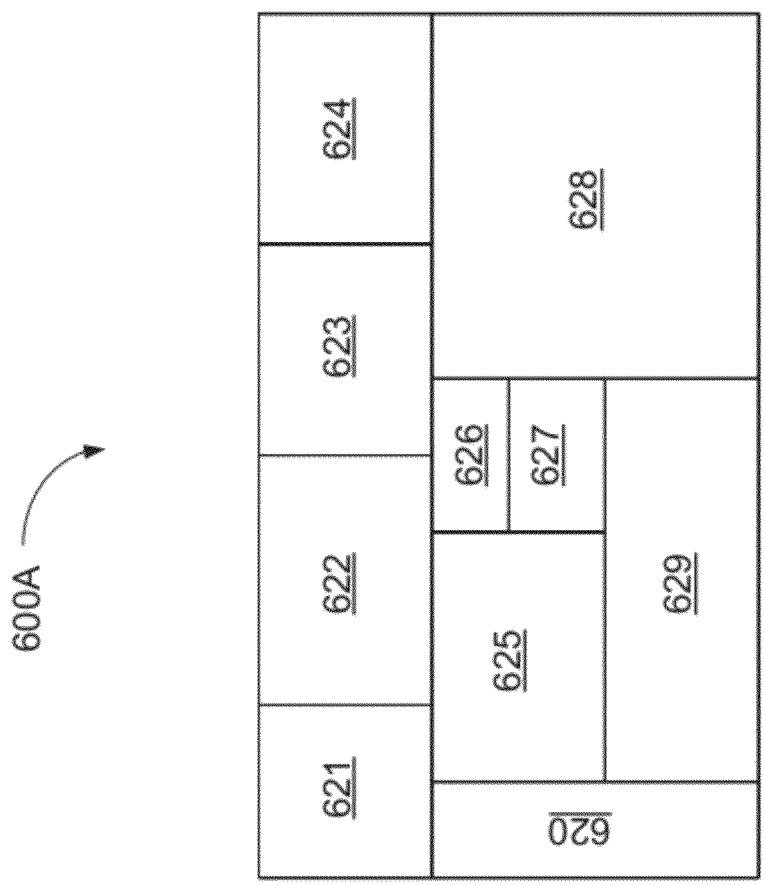
FIG. 6A illustrates a composite mosaic video stream divided into different barker videos in accordance with one or more features of the disclosure herein.

FIG. 6A illustrates a composite video stream 600A whose screen area has been divided into multiple different sized onscreen locations in accordance with one or more features of the disclosure herein. In the example shown, a composite video stream 600A may be encoded to include a mosaic of ten different videos for rendering at ten different onscreen locations 621-630. Each video onscreen location 621-630 may correspond to a different area of an output device, such as onscreen locations of a television display. As such, if a requested or required video is for an area in the upper left hand corner of the television display, the system may be configured to transmit a composite video stream with the requested video in the upper left hand corner with respect to a video screen. Any of a number of different (or same) sized locations may be implemented in a composite video stream and a plurality of video streams like in composite video stream 600A may be utilized by a system. For a composite video stream as described herein, such as composite video stream 600A, at least two videos of the composite video stream cannot be displayed concurrently on the output device.

Therefore, a single composite video stream includes, in this example, ten different videos. For the example of FIG. 6A, as long as ten different barker channels utilize different, non-overlapping, onscreen locations 621-630, for the video of the barker channel, a single composite video stream 600A may be utilized for all ten barker channels. As previously described, approaches to transmitting barker channels have each barker channel transmitted on its own full-sized video stream with the area of the video stream that is unused simply being black. In such systems, the receiving device overlays text in the blacked out portions of the video stream. Yet, for ten different barker channels, ten different video streams are needed. In the example described with respect to FIG. 6A, so long as the barker channels utilize different onscreen locations for the video content, multiple videos for different barker channels may be included in a single composite video stream. Thus bandwidth over the system is reduced.

In some embodiments herein, a user can request to obtain a particular video (e.g., a barker video), and can also request that it be of a specified size (e.g., quarter screen) and positioned at a selected location on the screen (e.g., upper-right corner). A video server can determine which composite video stream happens to have unused onscreen space in which the requested video will fit. By sizing and placing the video prior to transmission, the receiving device need not possess processing capability to resize or reposition the barker video, and can instead simply tune to the correct channel and mask out the unwanted portions. The system may determine a portion of a composite video stream, such as the video stream at onscreen location 621, of the plurality of video streams in the composite video streams, such as composite video stream 600A, based upon the desired particular onscreen location of the video on the eventual display screen. In this case, a user may desire to have a requested video appear in the upper left hand corner of a display screen instead of a default onscreen location, such as the lower left hand corner of the display screen.

Therefore, the system may determine that the video stream at onscreen location 621 is available for transmitting the requested video. For a video on demand service, location 621 in FIG. 6A may be the default location at an output device for a video image to be shown. As such, as described below, this default area may be determined to identify onscreen location 621 for insertion of a requested video corresponding to that onscreen location. Although the onscreen location 621 may be the default location, a user may want to adjust the size of the video on her display screen to be bigger and/or in a different location on the display screen as described in FIGS. 6C and 6D. In such a case, the system may be configured to identify a different onscreen location, if any, in the same or another composite video stream of a plurality of available composite video streams that meets the onscreen location needs of the user.

Figure 6B:
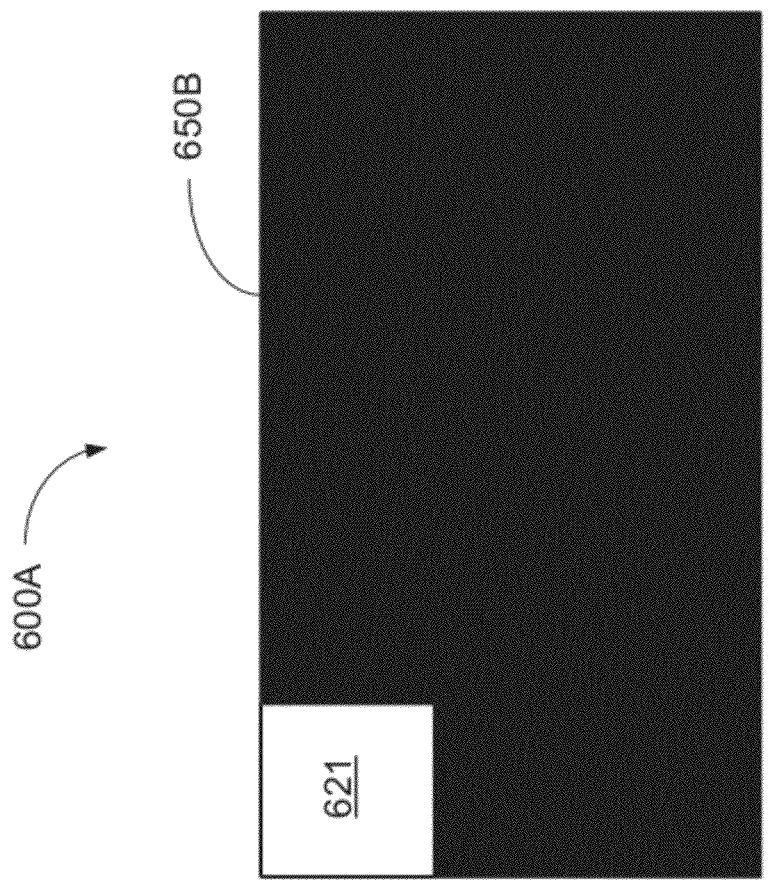
FIG. 6B illustrates a rendered barker channel with video content at a default onscreen location in accordance with one or more features of the disclosure herein.

When accessing a barker channel for the first time, a default onscreen location for video content of the barker channel may be defined. FIG. 6B illustrates a rendered barker channel with video content at a default onscreen location 621 in accordance with one or more features of the disclosure herein. For this example of a barker channel, composite video stream 600A from FIG. 6A is utilized. In rendering the barker channel to an end user device, a receiving device overlays text and/or other data to mask out the other video content at onscreen locations 622-630. In the example of FIG. 6B, the default video content for the barker channel is at onscreen location 621 and the other video content at onscreen locations 622-630 are masked 650B. The video content shown at onscreen location 621 in FIG. 6B may be too small for a viewer and she may desire to increase the size of the video content. In such a case, a user may change the size of the video content to increase the size and/or reposition the video content.

Figure 6C:
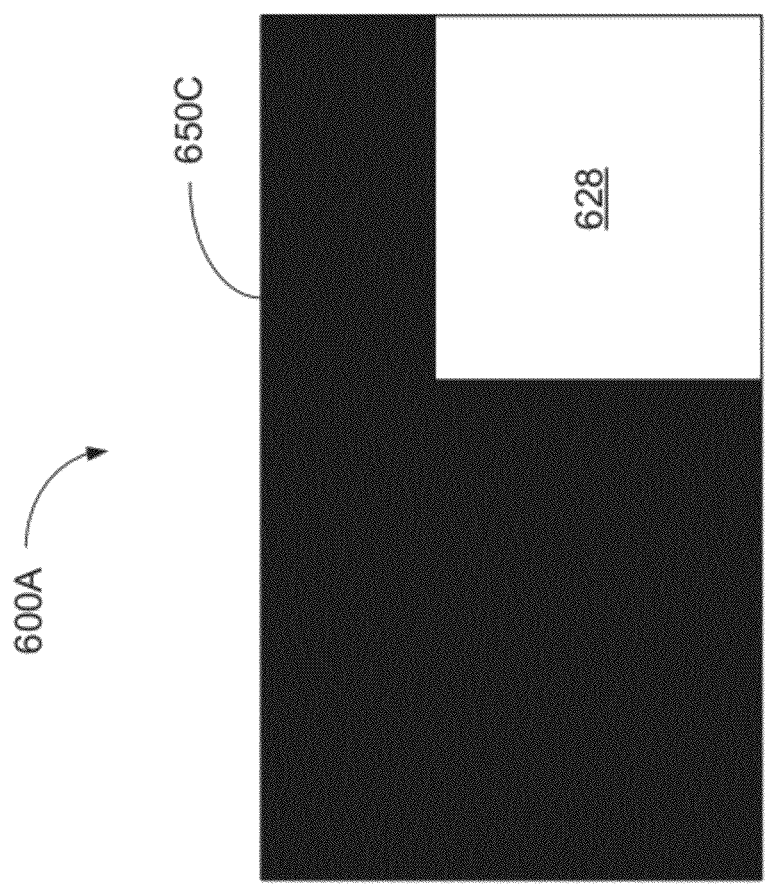
FIG. 6C illustrates a rendered barker channel with video content at a user requested onscreen location in accordance with one or more features of the disclosure herein.

FIG. 6C illustrates a rendered barker channel with video content at a viewer requested onscreen location 628 in accordance with one or more features of the disclosure herein. In this example, upon a request to increase the size of the video received from a user input device, the system may change to a different video stream of the same composite video stream 600A. For this example of a barker channel with viewer requested onscreen video location, composite video stream 600A from FIG. 6A is still utilized. In rendering the barker channel to an end user device, a receiving device overlays text and/or other data to mask out the other video content at onscreen locations 622-627 and 629-630. In the example of FIG. 6C, the viewer requested video content for the barker channel is at onscreen location 628 and the other video content at onscreen locations 621-627 and 629-630 are masked 650C.

Figure 6D:
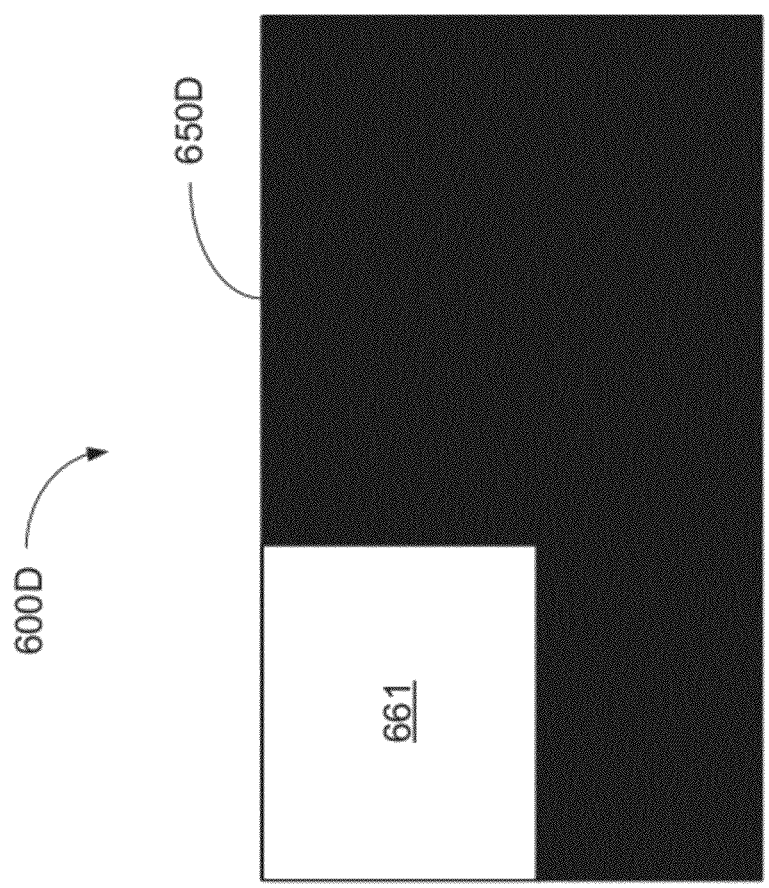
FIG. 6D illustrates a rendered barker channel with video content at another user requested onscreen location in accordance with one or more features of the disclosure herein.

FIG. 6D illustrates a rendered barker channel with video content at another user requested onscreen location 661 in accordance with one or more features of the disclosure herein. Alternatively to FIG. 6C, a user may desire to change the size and/or location of video content for a barker channel to a size and/or position not supported within composite video stream 600. In such an example, upon a request to increase the size of the video received from a user input device, the system may change to a different composite video stream 600D. In rendering the barker channel to an end user device, a receiving device overlays text and/or other data to mask out the other video content at other onscreen locations. In the example of FIG. 6D, the viewer requested video content for the barker channel is at onscreen location 661 of composite video 600D and the other video content at the other onscreen locations are masked 650D. In the example of FIG. 6D, a different composite video stream 600D may be utilized in place of the first composite video stream 600A that may include a default onscreen location for video content associated with a particular barker channel.

As described herein, the different onscreen locations 621-630 shown in FIG. 6A may be locations for barker videos associated with a service and/or product. For example, ten different barker videos, such as videos corresponding to program channels labeled 780-789 on an electronic program guide of a cable provider, may be utilized for ten different infomercials on ten different phone order products. If a user requests to turn to program channel 780 that is an infomercial for a kitchen product, the default video location associated with the infomercial may be obtained from a single composite video stream, such as composite video stream 600A in FIG. 6A, which happens to already have the requested video placed to appear in the default onscreen location. The default video location associated with the infomercial for program channel 780 may appear at an upper right hand corner onscreen location, such as onscreen location 624 in FIG. 6A. As such, the system may obtain the requested video for channel 780 at its default location from the video included in a composite video stream 600A for onscreen position 624.

In the example composite video stream 600A in FIG. 6A, the composite video stream is a composite of ten videos. Any of the videos may be shown simultaneously at the respective onscreen locations on an end device without the need for a second tuner. Because all ten videos are transmitted on a single composite video, any or all of the ten may be shown on a display screen in their respective onscreen positions. As such, there is no need to transmit ten different video streams alone. Rather, all ten are transmitted as one single composite video stream where the position and size of the individual videos are fixed.

Alternatively, the onscreen locations 621-630 may be locations of videos for use by individual services, such as CNN, ESPN, or MS-NBC, of a television listing. In such a circumstance, a content reception display device of a user may be configured to display multiple different videos for corresponding multiple different services of the television listing within the composite video stream simultaneously while utilizing only one tuner device. In one example with respect to FIG. 6A, a content reception display device may be configured to display three different videos from corresponding services for onscreen locations 621, 624, and 629 simultaneously while utilizing only one tuner device. In such an example, a locally generated overlay may cover the other respective video locations, such as 622, 623, and 625-628 in FIG. 6A, with textual information about the three videos shown, such as a channel number, a channel label, an interactive interface, and/or other data. Any of a number of the multiple different videos corresponding to the multiple different onscreen locations 621-630 may be displayed. As such, fewer decoders and/or decoding processing are needed. A user may implement a picture in picture environment without the need for the second tuner device for the second channel being shown. In accordance with at least one aspect described herein, any associated audio for each video in respective onscreen locations 621-630 may be sent as packets having a unique packet identifier (PID) within an MPEG transport image for selective listening by the user, preventing any collisions. In addition, one or more of the plurality of composite mosaic video streams may be configured to be in standard definition (SD) format for legacy equipment. Such a need may depend, for example, on the decoders of the legacy equipment.

Figure 7:
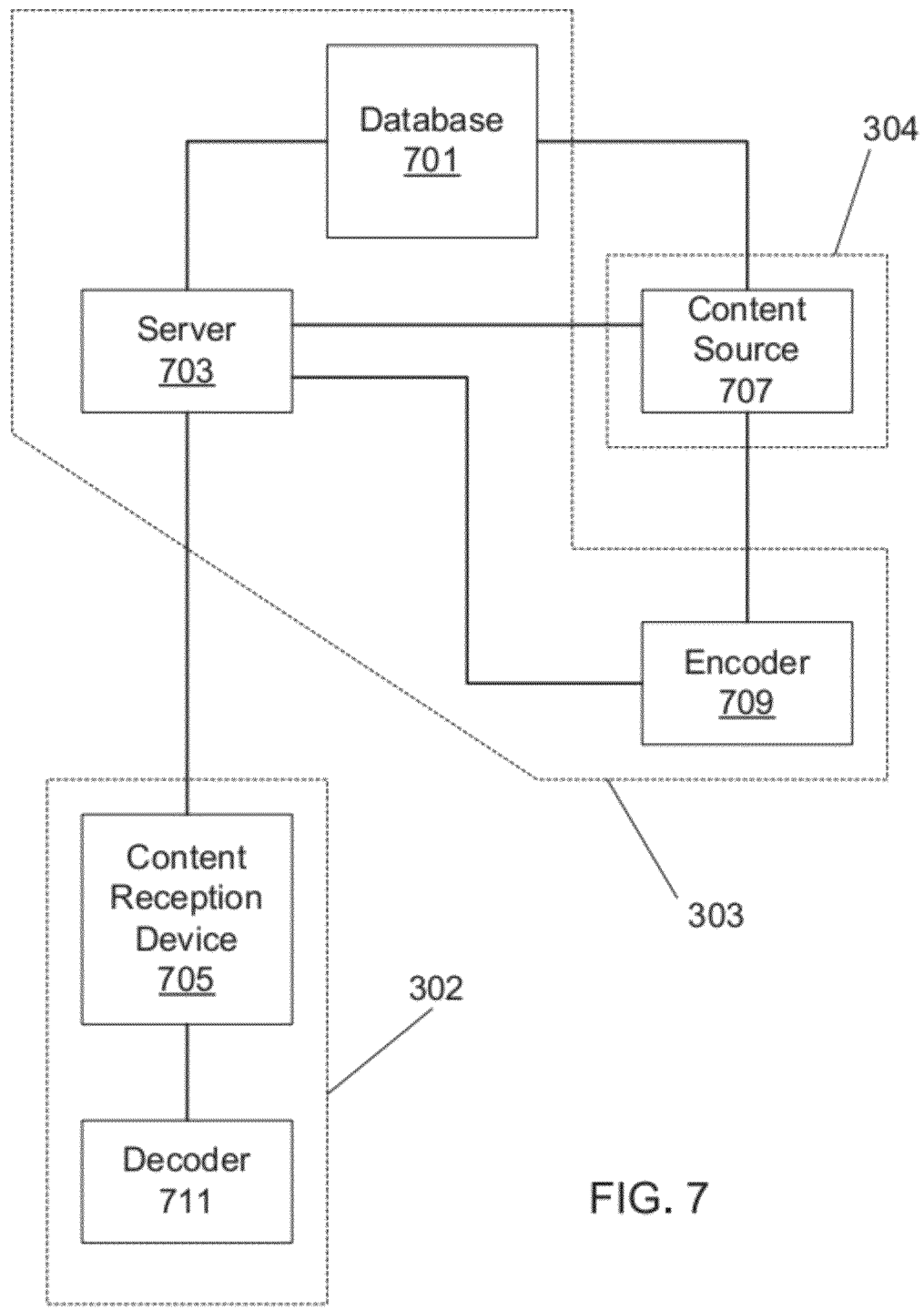
FIG. 7 illustrates an example block diagram of a system for transmission of multiple video services in a composite mosaic video stream in accordance with one or more features of the disclosure herein.

FIG. 7 illustrates an example block diagram of a system for transmission of multiple videos in a single composite mosaic video stream in accordance with one or more features of the disclosure herein. The system is shown to include a database of a plurality of available composite mosaic video streams 701 that may be controlled by an assignment server 703. The database 701 and assignment server 703 may be operatively connected at a central office. When a user launches a video on demand (VOD) service or any other of a number of resources that uses video content, a request for a particular video may be sent, such as via an upstream channel on line 301 in FIG. 3, from a device associated with the user, such as a content reception device 705, to the assignment server 703. Content reception device 705 may be included within a gateway 404 and/or network interface device 405 as shown and described with respect to FIG. 4. Such a request may include, for example, data identifying the requested video, but also data regarding the video size of the requested video and data regarding the audio stream bitrate associated with the requested video. Assignment server 703 may maintain control over the video content transmitted within the plurality of composite mosaic video streams in the database 701, and may determine the current availability/utilization of each individual video content (or file) in the database 701.

In the example of a user requesting an onscreen location, the option for choosing the onscreen location may be part of a user interface where predefined options are provided, such as 3 predefined options, 1) taking up 10% of a display screen in the upper right hand corner, 2) taking up 25% of a display screen in the lower right hand corner, or 3) taking up 50% of a display screen on the left side of the display screen. Since all three options are at different onscreen locations that do not overlap, a single composite mosaic video stream may be utilized for any option requested by a user. The content reception device of the user merely changes the locally generated overlay to cover the unused areas of the composite mosaic video stream based upon the option chosen. The locally generated overlay may include textual information about the video being shown and/or other data.

In still other examples of a user requesting an onscreen location, the option for choosing the onscreen location may be part of a user interface where a user may provide a requested side and/or location of the video. A user interface may be provided to allow a user to select a size and/or location of the video. A first box defining the size of the video may be provided within a second box defining the size of display screen. A user may adjust the size of the first box with a remote control or other input device to select a desired size of the video to be shown. As described herein, if the location and size requested by the user matches an onscreen location of a particular composite mosaic video stream, that particular composite mosaic video stream may be transmitted to the content reception device of the user. If no match currently occurs, the system may be configured to generate a composite mosaic video stream matching the desired requested video size and location of the user for transmission.

Figure 8:
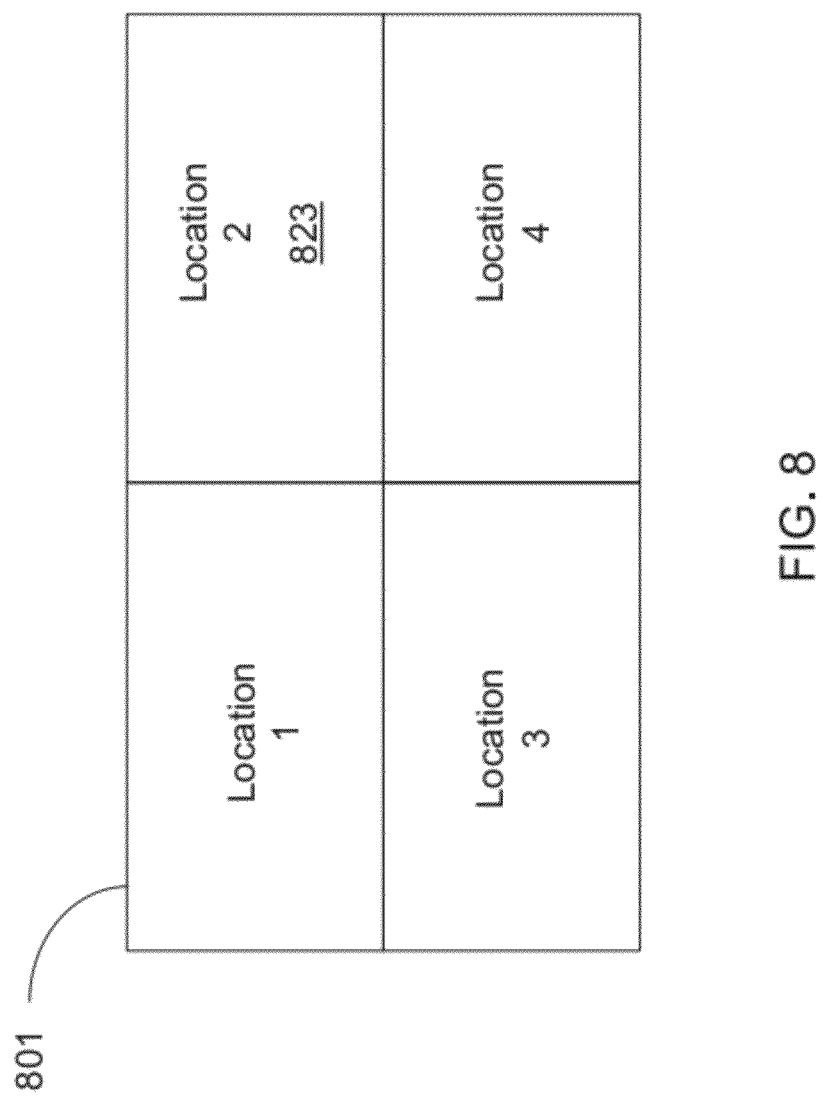
FIG. 8 illustrates a video stream outputted to a display screen with the stream divided into different locations for barker videos in accordance with one or more features of the disclosure herein.

Based on the user requested dimensional video size and location, the assignment server 703 may determine an onscreen location within one of the plurality of composite mosaic video streams where the requested video may be inserted at an onscreen location as part of a composite mosaic video stream for transmission to the requesting user. The onscreen location within one of a plurality of composite mosaic video streams may be a location that correlates to an onscreen location on an output device that the user will use to view the requested video. Onscreen locations may be identified by pixel positions on the output device. Pixel positions may correlate to a specific area that defines a region of a display screen of an output device. As such, if a barker video is expected to be outputted to an upper right hand region of a display screen of an output device, the barker video location may be defined as a particular location within a composite mosaic video stream that correlates to a particular onscreen location of a display screen of an output device. In accordance with one example with reference to FIG. 8, a location may be a pixel designation that defines a quarter 823 of a display screen 801 of an output device and the location 2 823, in this case the quarter of the screen 801, may be the upper right hand side of the screen 801.

Returning to FIG. 7, such location information may be sent, via wired and/or wireless connection, to a content source 707 of the requested video. The content source 707 may send, via wired and/or wireless connection, the requested video to an encoder 709, which places or encodes the requested video along with one or more other videos into a single composite mosaic video stream of the plurality of available composite mosaic video streams in the database 701, which is then sent to the assignment server 703.

The content reception device 705 may then receive a response from the assignment server 703 with the composite mosaic video stream. With the received composite mosaic video stream, the content reception device 705 may be configured to detect which video in the composite mosaic video stream to output. A decoder 711 may receive the composite mosaic video stream via connection path G to output the requested video. The content reception device 705 may further be configured to crop and relocate the portion of the composite mosaic video with the video to be viewed.

Dynamic sized videos also may be implemented in accordance with one or more features described herein. A user may desire to change the size and/or location of the video being displayed. For example, a user may desire that the video previewing currently available movies for rent in an on demand environment be enlarged on her television screen to see the preview better. In response, the system may be configured to look for a composite mosaic video stream having an available onscreen location for such an adjusted size video in database 701. For example, in the composite video stream 600 of FIG. 6A, a user may be shown the video previewing currently available movies for rent at onscreen location 624. In response to a request to enlarge the video, the system may be configured to determine if the same composite video stream has the requested video in another onscreen location matching the size and/or location desired by the user. Thus, a user gets an enlarged video without the system having to request and receive new data. The system can utilize a different portion of the same composite mosaic video stream to accommodate the requested adjustment by the user.

In some circumstances, the desired adjusted size video may not be in the same composite mosaic video stream on which the previous version of the video was received. As such, the requested adjusted size video content may need to be sent via a different composite mosaic video stream. One of the plurality of video streams in database 701 may have an unused predefined location, for output on a display device, correlating to the adjusted size video. Such a request may be similar to the one the user first made when initially choosing the video, although it may supply different size and/or location parameters from the original request, to reflect the resizing/repositioning request. The assignment server 703 may determine where, if anywhere, this new size adjusted video may fit in one of the plurality of composite mosaic video streams in database 701. As similarly described above, such location information may be sent to the content source 707 of the requested video.

The content source 707 may prepare a suitably sized version of the requested content, and send the requested video to the encoder 709, which places or encodes the requested size adjusted video along with one or more other videos, such as a second video, into a new composite mosaic video stream of the plurality of available video streams in the database 701, which is then sent to the assignment server 703. The content reception device 705 then may receive a response from the assignment server 703 with the new composite mosaic video stream. With the received new composite mosaic video stream, the content reception device 705 may be configured to detect which location in the new composite mosaic video stream contains the resized video requested by the user, and process it for output by decoder 711. The content reception device 705 may further be configured to crop and relocate the portion of the new composite mosaic video with the size adjusted video to be viewed.

For the above example of a size adjustment requested by an end user on a movie preview video in an on demand environment, a request for a size adjusted first video may be received by an assignment server 703 from an end user device, such as a content reception device 705. In one example, a user may utilize a remote control associated with the content reception device 705 to select a user interface option. The user interface may include an option that allows a user to change the position and/or size of the video showing the movie previews. In one example, the option may allow for changing the size of the video displayed on an output device associated with the content reception device. Any of a number of manners for allowing a user to change the size and/or position may be utilized. One or more a pull down/drop down boxes of various optional sizes and/or configurations may be utilized. The pull down/drop down may show a miniature screen with predefined locations from which the user can choose. Still further, the user dynamically may use a cursor to draw the desired size on the display screen.

The output device associated with the content reception device may be a television. A default position, such as in the upper right hand corner of an output display screen, and size, such as ¼ of the output display screen area, of the video may exist for a user to see. Utilizing an option provided to the user, the position may be changed, such as to the lower left hand side of an output display screen, and/or the size of the video may be changed, such as to ¾ of the size of the output display screen area. The request for a size adjusted first video may include data such as an identification of the user, a specific option chosen by the user, and how the size of the video is represented in a final form on an output device associated with a content reception device.

Assignment server 703 may determine the current availability/utilization of each individual composite mosaic video stream being transmitted by the system, so that it can identify unused areas in the composite mosaic video streams and assign those areas to new requests for transmission. A new onscreen location to place or encode the requested size adjusted first video, if any, within one of the plurality of composite mosaic video streams in database 701 may be determined, by the assignment server 703, based upon the new size that the user has requested. For this determination, assignment server 703 may be configured to match the size adjusted video size to an unused location fitting that size in one of the plurality of composite mosaic video streams in database 701. The onscreen location may be a specific area, within one of the plurality of composite mosaic video streams in database 701, which defines a region of a display screen. The new location information may be transmitted, by the assignment server, to the content source 707 of the requested size adjusted first video.

The assignment server 703 then may receive, from the content source 707, the requested size adjusted first video based upon the new onscreen location for the size adjusted first video. The requested size adjusted first video may be placed or encoded with at least one third video into a second composite mosaic video stream based upon the new onscreen location by an encoder 709. Finally, the second composite mosaic video stream may be transmitted to the content reception device 705. The second composite mosaic video stream may be the same composite mosaic video stream as first utilized by the assignment server 703 or may be a different composite mosaic video stream of the plurality of video streams in database 701 utilized by the assignment server

703. The resulting composite mosaic video stream may include reduced-sized videos arranged in user-specified arrangements for a display in addition to one or more default size and position videos.

In one illustrative configuration, assignment server 703, database 701, and encoder 709, as illustratively shown by a dashed line box in FIG. 7, may be included as part of the central location 303 described above with respect to FIG. 3. Content source 707, as illustratively shown by a dashed line box in FIG. 7, may be included as part of content source 304 described above with respect to FIG. 3. Content reception device 705 and decoder 711, as illustratively shown by a dashed line box in FIG. 7, may be included as part of a home 302 as described above with respect to FIG. 3.

Figure 9:
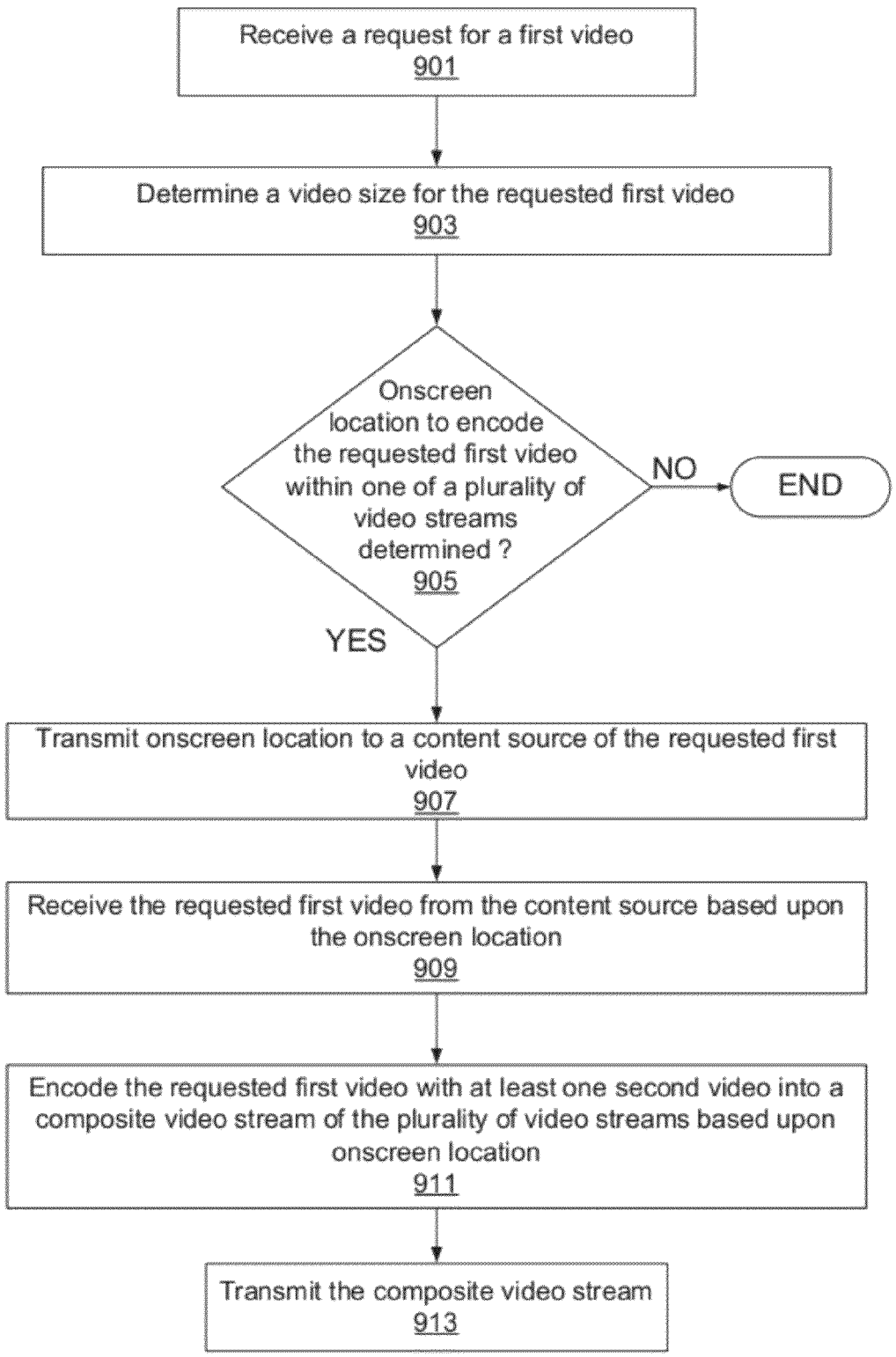
FIG. 9 is an illustrative flowchart of a method for transmitting multiple video images in a composite mosaic video stream in accordance with one or more features of the disclosure herein.
Figure 10:
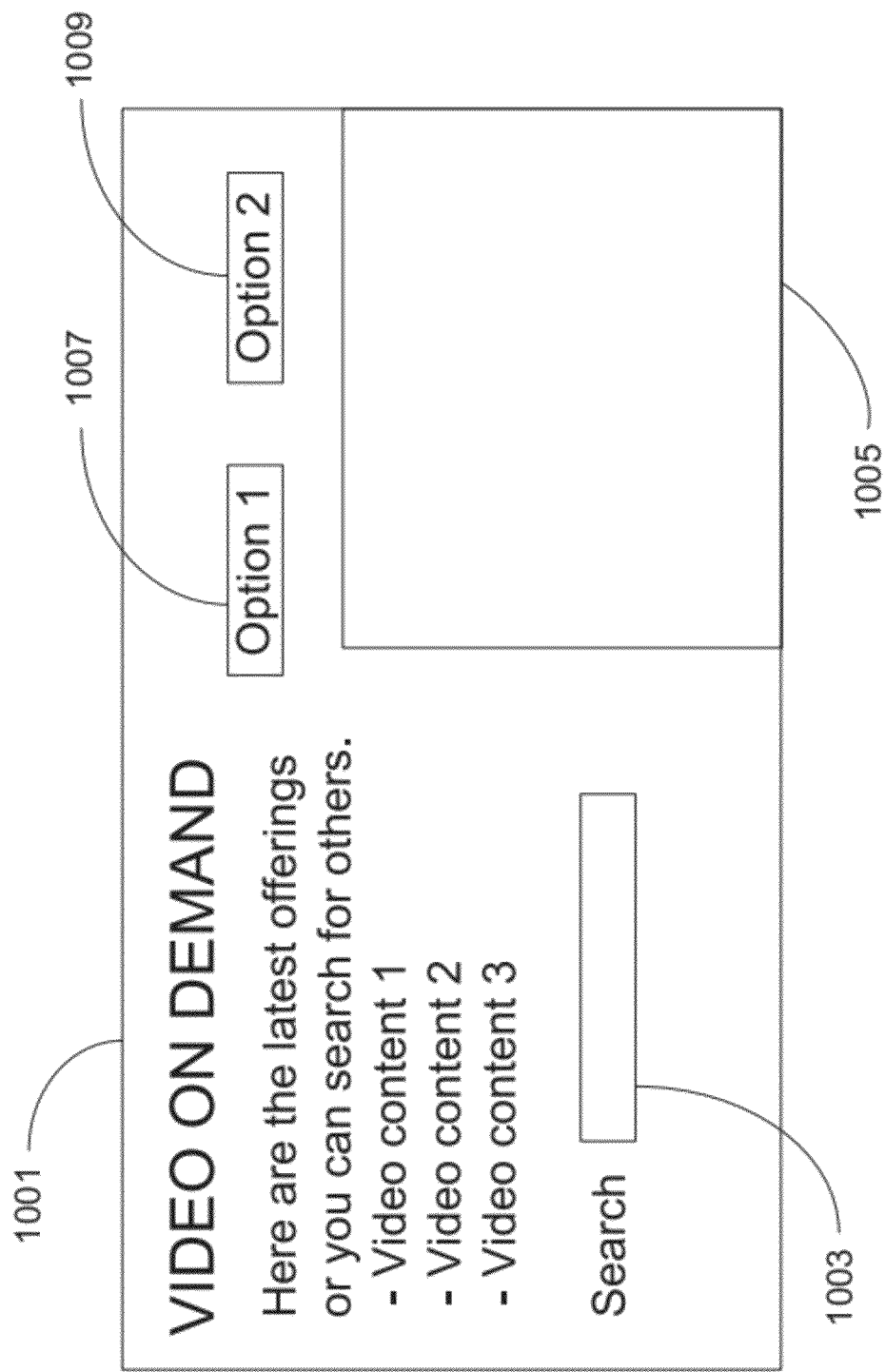
FIG. 10 illustrates an example display screen in accordance with one or more features of the disclosure herein.

FIG. 9 is an illustrative flowchart of a method for transmitting multiple videos in a composite mosaic video stream in accordance with one or more features of the disclosure herein. The example provided as follows relates to a user interfacing with a video on demand (VOD) service offered by a service provided. This is but one example use of the illustrative uses of the present disclosure. The process starts and at 901, a request for a first video may be received from an end user device. Such a request may be received from an end user video device (e.g., STB, DVR, personal computer, mobile television device, cell phone, etc.) of an end user, for example, in her home accessing a video on demand (VOD) service. Initiating a request to access a video on demand service for eventual display of a user interface 1001 and a preview area 1005 as shown in FIG. 10 may constitute one example of a request for a first video. As described below, FIG. 10 may be an illustrative user interface associated with the VOD service that eventually may be displayed in response to the video request of 901. The user interface 1001 of FIG. 10 may result from step 1209 in FIG. 12 described below.

In the example of FIG. 10, the video previewing current selections in preview area 1005 is a first video and a video device of the user accessing the video on demand service has sent the request in 901. Preview area 1005 may be a default size and space within the user interface 1001 for available video content previews to be displayed in a rolling and continuous manner. The user's video device may receive a composite mosaic video stream that has the first video in location 1005 and the user's video device may overlay associated text on the other video streams of the composite mosaic video stream. For example, the composite mosaic video stream may contain a composite image having regions as shown in FIG. 6A, where each region contains its own content, and in this example region 628 may be carrying the VOD preview image that appears in area 1005, and the other regions (e.g., 621, 622) may be locally overlaid by the user's receiving device (e.g., a gateway or set-top box). The video in those other regions might be used by other users, and ignored by the current user. The rolling and continuous previews may show previews of three movies (e.g., video content 1, video content 2, and video content 3). As such, in accordance with one or more features described herein, the location of this preview area 1005 for the first video needs to be determined for sending the appropriate located video to the video device of the user. Returning to FIG. 9, at 903, the video size for the first video may be determined. This may be in response to a request where the request correlates to a user accessing the video on demand service. Such a determination may be made by identifying the area within a display screen that the video is expected to be outputted and the size of that area. The area may be identified by the known configuration of the video to textual content in the video on demand default user interface.

Figure 11:
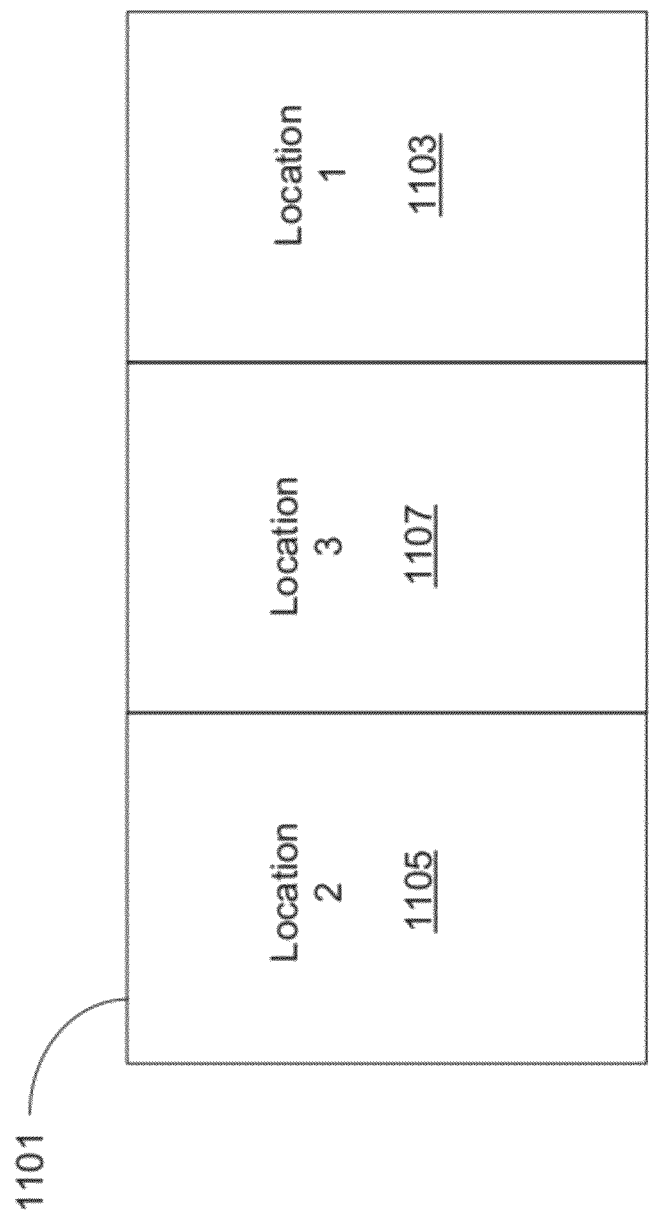
FIG. 11 illustrates a video stream outputted to a display screen with the stream divided into different locations for videos in accordance with one or more features of the disclosure herein.

At 905, a determination then is made as to whether an existing composite mosaic video stream has an unused screen area that will accommodate the requested first video at the requested size and location. If no available location may be found, a delay may occur until the requested area becomes free in an existing composite mosaic video stream. In one example, a composite mosaic video stream, such as shown in FIG. 11, of such a plurality of composite mosaic video streams may be able to maintain three encoded high definition videos, one located at a right ⅓ area 1103 within a display screen 1101 of a user, one located at a left ⅓ area 1105 within the display screen 1101 of the user, and one located in the remainder ⅓ area 1107 in the middle of the display screen 1101 of the user. The system may be configured to determine whether an unused onscreen location, matching the desired output device location for the requested video, within one of the plurality of composite mosaic video streams is available for use to include the requested video.

For example, returning to FIG. 6A, if someone requests the first video to be displayed in onscreen location 623, the system may determine if an unused onscreen location within one of the plurality of composite video streams is available to carry that particular requested video so that, when decoded, the output to a television (or other display device) of a user will have the video at onscreen location 623 of the television. If no unused location exists in 905, the process may end, may provide an error signal, may wait until a matching unused location is available, or may alternatively return to 903 and/or 905. If an unused location is available, the process moves to 907.

In 907, the location information (e.g., identification of composite mosaic stream having the space, identification of dimensions or screen area, etc.) may be transmitted to a content source of the requested first video. In the example of a video on demand service, the content source may be an external database. The particular first video that previews movies may be maintained in such a database. With the onscreen location information, the database can send the requested first video for eventual transmission to an end user device. Moving to 909, the requested first video for particular onscreen location purposes is received from the content source.

The requested first video then may be encoded in 911 with at least one second video into a composite mosaic video stream of the plurality of composite mosaic video streams based upon the database location information. As such, the composite mosaic video stream may include the requested first video in addition to other videos. For example, the composite video stream may be associated with FIG. 6A that includes ten videos for output to different areas of an output device. In another example, the first video and the second video may have no association with each other but for being included within the same composite mosaic video stream. The first video may be a video for a video on demand service while the second video may be a barker video for a channel utilizing the barker video in a particular location on its output for product advertising, such as an infomercial. Then, in 913, the composite mosaic video stream may be transmitted to the end user device. As described below with respect to FIG. 12, the end user device, such as a set-top box, may then decode the composite mosaic video stream to obtain the requested first video.

Figure 12:
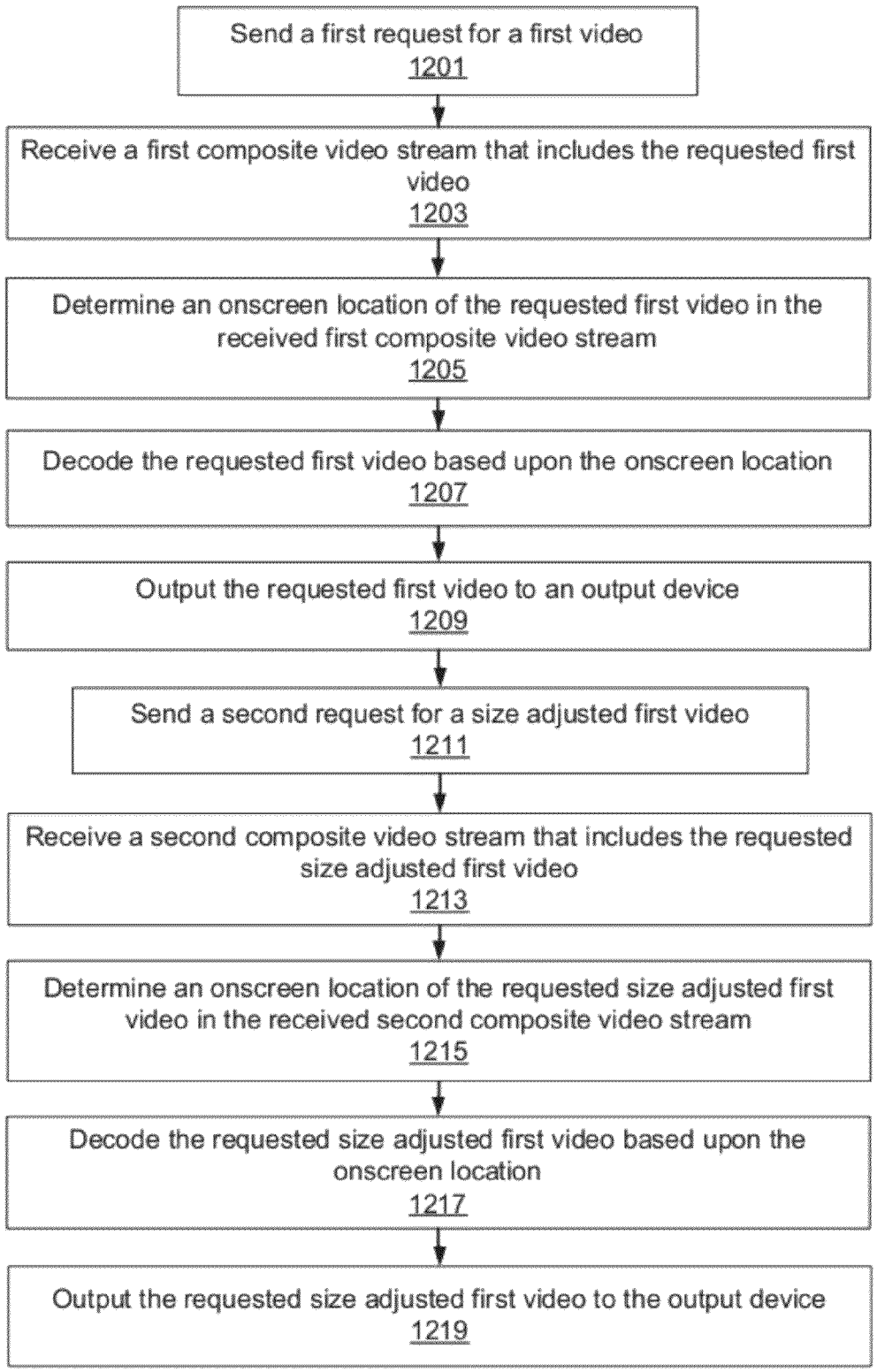
FIG. 12 is an illustrative flowchart of a method for receiving multiple video images in a composite mosaic video stream in accordance with one or more features of the disclosure herein.

FIG. 12 is an illustrative flowchart of a method for receiving multiple videos in a composite mosaic video stream in accordance with one or more features of the disclosure herein. The process starts and at 1201, a first request for a first video may be sent from an end user device. The request may identify the video size for the requested first video. Such a request may be a user of a video device (e.g., STB, DVR, personal computer, mobile television device, cell phone, etc.) in her home accessing a video on demand service. The video on demand service may include a default location for a video previewing current selections. In this example, this default located video previewing current selections is the first video and the video device of the user accessing the video on demand service is the request. Similarly, in the example of FIG. 10, the video previewing current selections in preview area 1005 may be a first video and a video device of the user accessing the video on demand service has sent the request in 1201.

At 1203, a first composite mosaic video stream that includes the requested first video may be received at the end user device, having a mosaic of videos prepared by the content server, with the requested video at the requested size and location in the image. As described above with respect to 923 in FIG. 9, the first composite mosaic video stream includes the requested first video and at least one second video. In the previous example of a user accessing a video on demand service, the composite mosaic video stream may be received by the video device of the user. At 1205, an onscreen location of the requested first video in the received first composite mosaic video stream may be determined. The set-top box at the end user may be configured to determine the onscreen location of the requested first video.

Proceeding to 1207, based upon the onscreen location of the requested first video, the requested first video may be determined by the end user device. Then, at 1209, the requested first video may be outputted to an output device associated with the end user device. In the previous example, the output device associated with the end user device may be a television associated with the video device. The video device may decode the composite mosaic video stream and obtain the video of the video on demand service from the composite mosaic video stream. The other portions of the composite mosaic video stream may be decoded as well, but may be overlaid by the user's device with other content, such as the user interface elements shown in FIG. 10.

User interface 1001 of FIG. 10 is an illustrative output from step 1209 in FIG. 12. A video shown in preview area 1005 may be the requested first video. Preview area 1005 may be a default size and space within the user interface 1001 for available video content previews to be displayed in a rolling and continuous manner. The rolling and continuous previews may show previews of video content 1, video content 2, and video content 3.

However, having received the video at the default size and location, the user may desire to increase the size of the default video being shown to better see the previewed movie. Returning to FIG. 12 and moving to 1211, a second request for a size adjusted first video may be sent from the end user device. The request may include information on the adjusted video size for the requested size adjusted first video. Such a request may be a user of a video device in her home accessing a video on demand service. The video on demand service may include a video previewing current selections and the user may desire to have the size of the video shown adjusted to a larger size or different location on the screen. In this example, the video previewing current selections that a user wants to be adjusted is the size adjusted first video and the video device of the user adjusting the size of the video of the video on demand service is the second request.

With respect to FIG. 10, if a user should desire to change the location and/or size of the preview area 1005, such as to see the previews even bigger on the display screen, the user may access one or more of the option buttons, such as Option 1 1007 and/or Option 2 1009. For example, selecting Option 1 1007 may lead to preview area 1005 being larger on the screen, such as to be 25% larger in size than the default size. Option 2 1009 may lead to preview area 1005 being even larger on the screen, such as 50% larger in size than the default size. Accessing of the one or more option buttons may constitute one example of a request for a size adjusted first video. Changing the size of the preview area 1005 may be useful to see the displayed video content more clearly. If a user has poor eyesight or smaller television displays, the user can adjust the size of the preview area 1005 to be bigger within the user interface 1001.

Returning to FIG. 12, at 1213, a second composite mosaic video stream that includes the requested size adjusted first video may be received at the end user device. The central office may instruct a user's content reception device as to which different composite mosaic video stream to tune to in order to obtain the new composite mosaic video stream having the new size/location. In another example, the same composite mosaic video stream may be utilized (e.g., if the existing stream happened to have unused space in the desired new size and location). The second composite mosaic video stream includes the requested size adjusted first video and one or more other videos in the mosaic (the other video(s) need not be of interest to the user, and can be overlaid and obscured by the user's device). In the previous example of a user accessing a video on demand service, the second composite mosaic video stream may be received by the video device of the user. At 1215, an onscreen location of the requested size adjusted first video in the received second composite mosaic video stream may be determined. The device at the end user may be configured to determine the onscreen location of the requested size adjusted first video.

Proceeding to 1217, based upon the onscreen location of the requested size adjusted first video the requested size adjusted first video may be decoded by the end user device. Then, at 1219, the requested size adjusted first video may be outputted to the output device associated with the end user device. In the previous example, the output device associated with the end user device may be a television associated with a set-top box. The video device may decode the second composite mosaic video stream and obtain the size adjusted video of the video on demand service from the second composite mosaic video stream. As such, following 1219, a user may see the video of the previews as a larger image on the display screen.

The location of where a smaller resolution video is being displayed, e.g., the pixel position, is not necessarily where the smaller resolution video has to be displayed on output devices associated with all end user devices. More advanced end user devices may have the hardware, software, and/or firmware necessary to relocate video on the screen, and thus do not care which pixel position in a video stream the smaller resolution video is located upon initial receipt. However, some end user devices may not have the hardware, software, and/or firmware necessary to relocate a video, and as such, may need to request a specific pixel location. One such benefit may be found in that if a single composite mosaic video stream is put into each quadrature amplitude modulation (QAM) channel, then users of a single end user device, such as a set-top box, may view picture in picture, of a video in the composite mosaic video stream, from any channel. A user may request a second smaller picture in picture channel from the shared composite mosaic video stream to be any channel she desires to have displayed, while she watches a full resolution linear channel.

Figure 13:
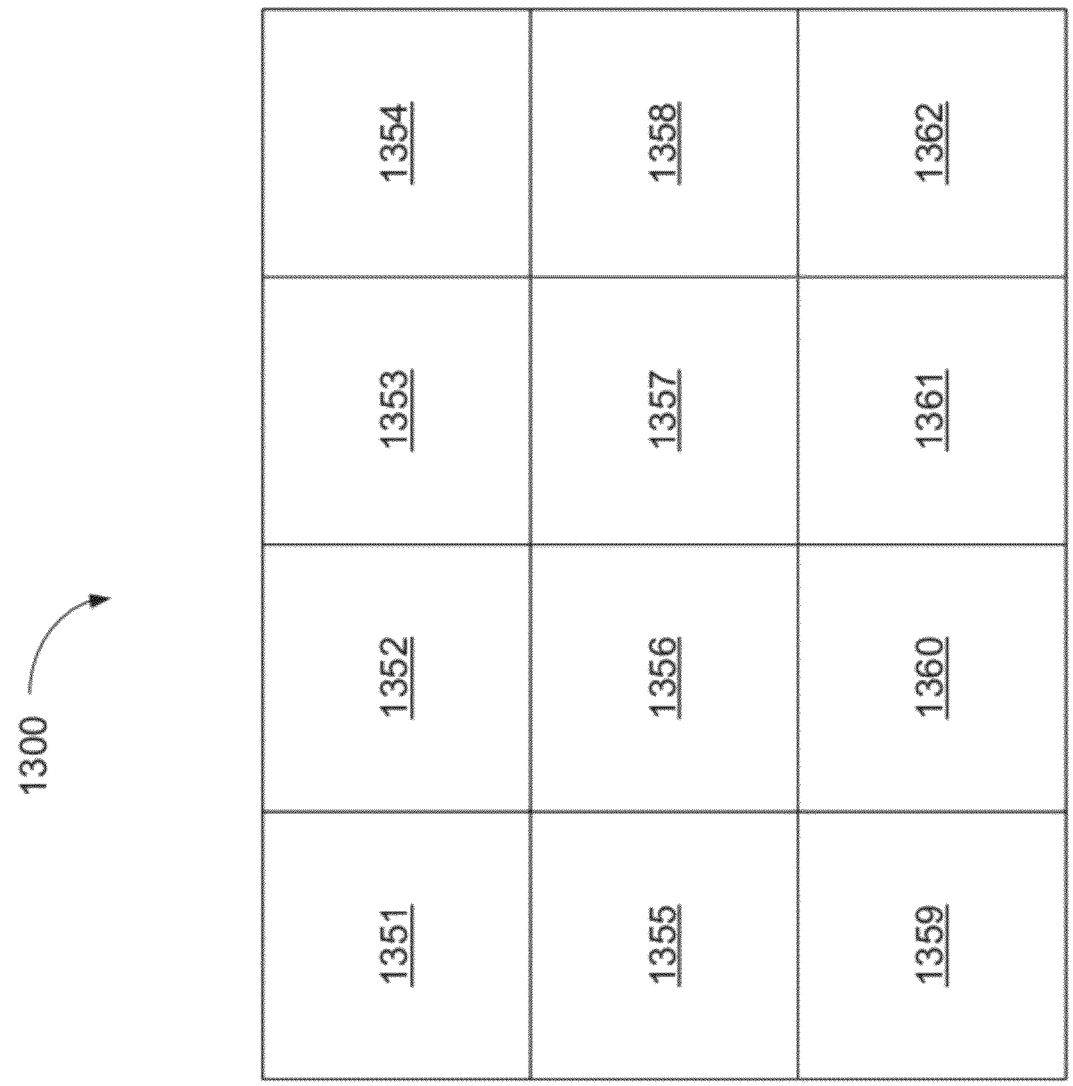
FIG. 13 illustrates a composite mosaic video stream divided into different barker videos in accordance with one or more features of the disclosure herein.

FIG. 13 illustrates a composite mosaic video stream 1300 divided into different barker videos in accordance with one or more features of the disclosure herein. In the example shown, a composite mosaic video stream 1300 may be encoded to include twelve different videos of particular onscreen locations 1351-1362. Each video of particular onscreen location 1351-1362 corresponds to a different video that may be outputted to an output device, such as a television display. No further upstream requests are needed when the user switches videos between videos carried in the same composite mosaic stream. In the example of FIG. 13, twelve different barker video onscreen locations 1351-1362 are in the composite mosaic stream 1300 corresponding to an upstream request.

Figure 14A:
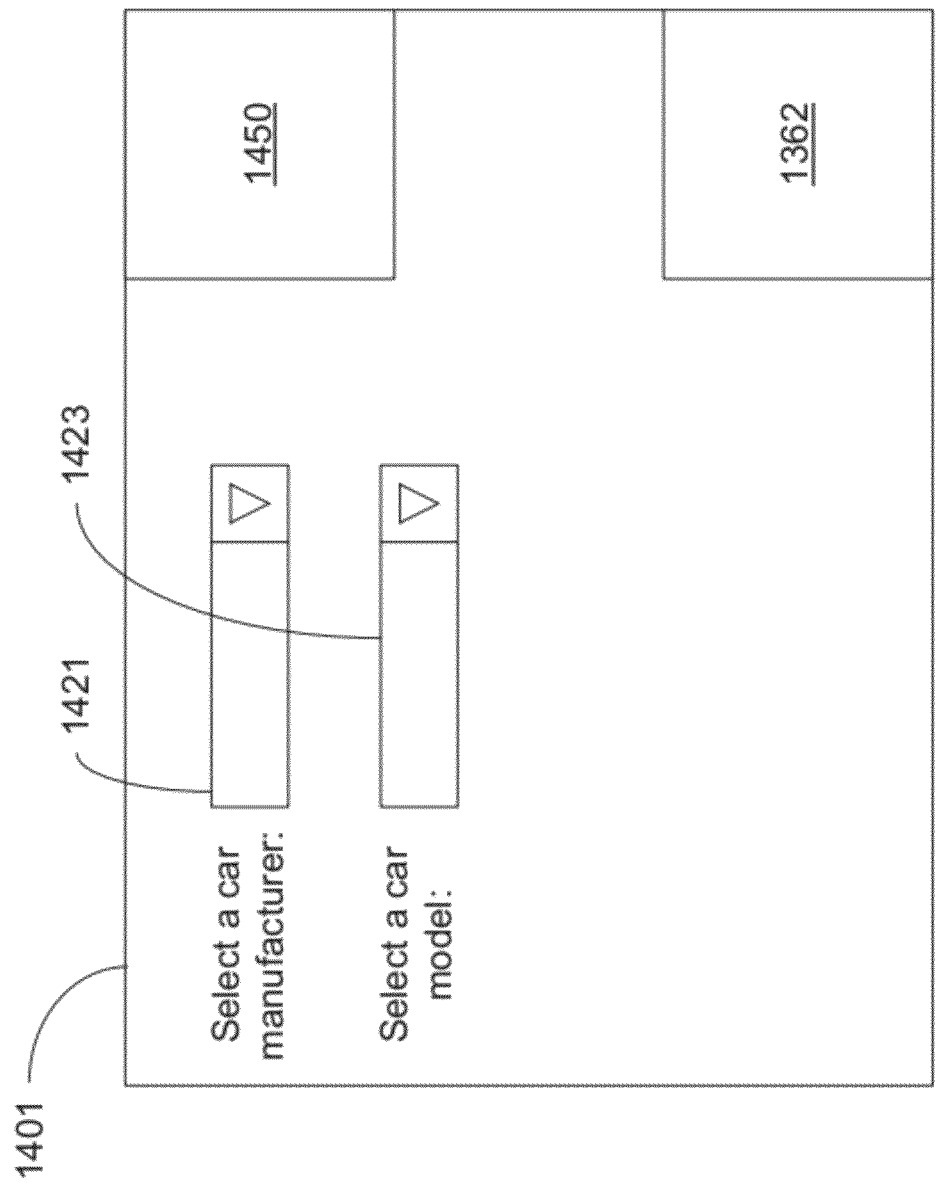
FIGS. 14A-14B illustrate example display screens in accordance with one or more features of the disclosure herein.
Figure 14B:
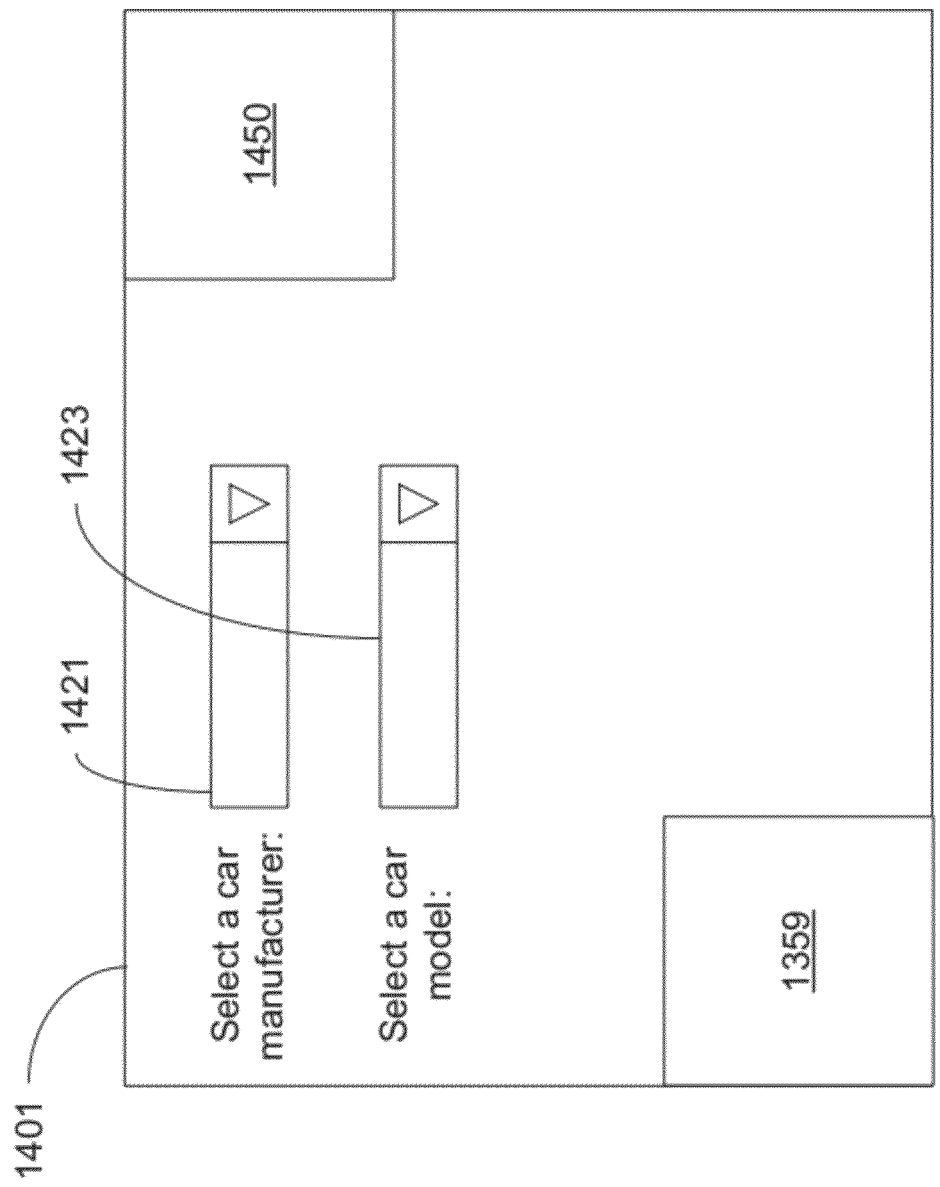

FIGS. 14A-14B illustrate example display screens in accordance with one or more features of the disclosure herein. In FIG. 14A, a display 1401 may be an interactive advertising channel for a product or service. In the example of FIGS. 14A-14B, the interactive advertising channel may be for automobiles. A user may be given one or more lists, drop down boxes, or other selection options 1421 and 1423, and a smaller video in the bottom right may be configured to show the selected product 1362 while a generic video 1450 plays in the top right of the display 1401. For the example of an interactive advertising channel for cars, video 1362 may be the default video shown when a user first chooses the interactive advertising channel and the generic video 1450 may be a looped 30 second video detailing the advertiser. In this example, a car corresponding to the default video may be shown rotating.

Moving to FIG. 14B, instead of setting up a session every time a user wants access to a new car selected via drop down boxes 1421 and/or 1423, by choosing the channel, the user has a single session to all available cars. Thus, when the user changes selections via drop down boxes 1421 and/or 1423, the user immediately may get a new video 1359, from FIG. 13, corresponding to the selected car rotating around without having to set up a new session or transmit a new upstream request for the new video 1356. The locally generated user interface rearranges itself to uncover different parts of the underlying image from the composite mosaic video; however, the video being shown need not be retrieved as part of a new session request. All of the twelve cars for the twelve videos 1351-1362 in FIG. 13 are in one session, even though that one session may be divided into smaller barkers.

Other embodiments include numerous variations on the devices and techniques described above. Embodiments of the disclosure include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause one or more devices to carry out operations such as are described herein.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present disclosure in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the disclosure.

The invention claimed is:

1. A method comprising:
    determining a location within a composite video stream, based upon a first video size, to place a first video associated with a first service, the determined location within the composite video stream corresponding to a location for insertion of video for output to an onscreen location of an output device;
    placing the first video, based at least upon the determined location, with at least one second video associated with a second service into the composite video stream, the first service and the second service being different services, wherein the at least one second video of the composite video stream is configured to be masked when the first video of the composite video stream is displayed on the output device;
    transmitting the composite video stream to a device associated with the output device;
    receiving a request prompting an adjustment of the first video from the first video size to a second video size;
    responsive to a determination that at least one third video in the composite video stream is the first video adjusted to the second video size, outputting the at least one third video to the device; and
    responsive to a determination that at least one third video in the composite video stream is not the first video adjusted to the second video size, encoding a size-adjusted version of the first video into a second composite video stream and transmitting the second composite video stream to the device.

2. The method of claim 1, wherein the composite video stream comprises a video image of a mosaic of multiple distinct videos positioned at different locations corresponding to onscreen locations of the output device.

3. The method of claim 1, further comprising:
    receiving a request for the first video from the device; and
    determining the first video size for the requested first video.

4. The method of claim 3, further comprising:
    transmitting information indicating the determined location to a content source of the requested first video; and
    receiving, from the content source, the requested first video based upon the determined location information.

5. The method of claim 1, wherein at least one of the composite video stream and the second composite video stream comprises a high definition composite video stream.

6. The method of claim 1, wherein the determining the location is based upon a pixel designation.

7. The method of claim 1, wherein encoding the size-adjusted version of the first video comprises:
    determining a new unused location, within one of a plurality of composite video streams, based upon the second video size, to place the size-adjusted version of the first video;
    transmitting information indicating the new unused location to a content source of the size-adjusted version of the first video; and
    receiving, from the content source, the size-adjusted version of the first video based upon the information indicating the new unused location.

8. The method of claim 7 further comprising placing the size-adjusted version of the first video into the second composite video stream based upon the new unused location.

9. The method of claim 1, wherein the determining a location comprises determining an unused location.

10. The method of claim 1, wherein the first video and the second video are videos of different size.

11. A method comprising:
determining an unused location, within one of a plurality of composite mosaic video streams, based upon a determined first video size, to encode a requested first video associated with a video service, the unused location corresponding to a location for insertion of video content for output to an onscreen location of an output device associated with a device;
encoding the requested first video at the unused location in the one of the plurality of composite mosaic video streams, wherein the one of the plurality of composite mosaic video streams also comprises at least one second video associated with the video service;
causing transmission of the one of the plurality of composite mosaic video streams to the device;
receiving a request prompting an adjustment of the requested first video from the determined first video size to a requested video size;
responsive to a determination that at least one third video of the plurality of composite mosaic video streams is the requested first video adjusted to the requested video size, outputting the at least one third video to the device; and
responsive to a determination that at least one third video of the plurality of composite mosaic video streams is not the requested first video adjusted to the requested video size, encoding a size-adjusted version of the requested first video into a second composite mosaic video stream and causing a transmission of second composite mosaic video stream to the device.

12. The method of claim 11, wherein the one of the plurality of composite mosaic video streams comprises a video image of a mosaic of multiple distinct videos positioned at different locations corresponding to onscreen locations of the output device.

13. The method of claim 11, further comprising:
receiving a request for the requested first video from the device; and
determining the first video size for the requested first video.

14. The method of claim 11, further comprising:
transmitting information indicating the unused location to a content source of the requested first video; and
receiving, from the content source, the requested first video based upon the unused location information.

15. The method of claim 11, wherein determining the unused location is based upon a pixel designation.

16. The method of claim 11, wherein the encoding the size-adjusted version of the requested first video comprises:
determining a new unused location, within the second composite mosaic video stream, based upon the requested video size;
transmitting information indicating the new unused location to a content source of the size-adjusted version of the first video; and
receiving, from the content source, the size-adjusted version of the requested first video based upon the information indicating the new unused location.

17. The method of claim 11, wherein at least one composite video stream of the plurality of composite mosaic video streams is a high definition composite video stream.

18. An apparatus comprising:
at least one processor; and
at least one memory having stored therein machine executable instructions, the at least one memory and the machine executable instructions configured to, with the at least one processor, cause the apparatus to:
determine a location within a composite video stream, based upon a first video size, to place a first video associated with a first service, the determined location within the composite video stream corresponding to a location for insertion of video for output to an onscreen location of an output device;
place the first video, based at least upon the determined location, with at least one second video associated with a second service into the composite video stream, the first service and the second service being different services, wherein the at least one second video of the composite video stream is configured to be masked when the first video of the composite video stream is displayed on the output device;
transmit the composite video stream to a device associated with the output device;
receive a request prompting an adjustment of the first video from the first video size to a second video size;
responsive to a determination that at least one third video in the composite video stream is the first video adjusted to the second video size, output the at least one third video to the device; and
responsive to a determination that at least one third video in the composite video stream is not the first video adjusted to the second video size, encode a size-adjusted version of the first video into a second composite video stream and transmit the second composite video stream to the device.

19. The apparatus of claim 18, wherein the encoding the size-adjusted version of the first video comprises:
determining a new unused location, within the second composite video stream, based upon the second video size, to place the size-adjusted version of the first video;
transmitting information indicating the new unused location to a content source of the size-adjusted version of the first video;
receiving, from the content source, the size-adjusted version of the first video based upon the information indicating the new unused location; and
placing the size-adjusted version of the first video into the second composite video stream based upon the new unused location.

20. The apparatus of claim 18, wherein the composite video stream comprises a video image of a mosaic of multiple distinct videos positioned at different locations corresponding to onscreen locations of the output device.

* * * * *